April 9, 1963

R. C. WILSON ETAL 3,085,245

AUTOMATIC SWITCHOVER SYSTEM FOR RADIO TRANSMITTERS

Original Filed Dec. 10, 1956

INVENTORS
ROBERT C. WILSON and
ROBERT J. PUCHATY
BY Mason, Kolehmainen,
Rathburn and Wyss.
ATTORNEYS

*INVENTORS*
ROBERT C. WILSON and
BY ROBERT J. PUCHATY

ATTORNEYS

April 9, 1963 R. C. WILSON ETAL 3,085,245
AUTOMATIC SWITCHOVER SYSTEM FOR RADIO TRANSMITTERS
Original Filed Dec. 10, 1956 7 Sheets-Sheet 5

INVENTORS
ROBERT C. WILSON and
ROBERT J. PUCHATY
BY
Mason, Kolehmainen, Rathburn and Wyss
ATTORNEYS April 9, 1963   R. C. WILSON ETAL   3,085,245
AUTOMATIC SWITCHOVER SYSTEM FOR RADIO TRANSMITTERS
Original Filed Dec. 10, 1956   7 Sheets-Sheet 6

INVENTORS
ROBERT C. WILSON and
ROBERT J. PUCHATY
BY
Mason, Kolehmainen, Rathburn and Wyss
ATTORNEYS

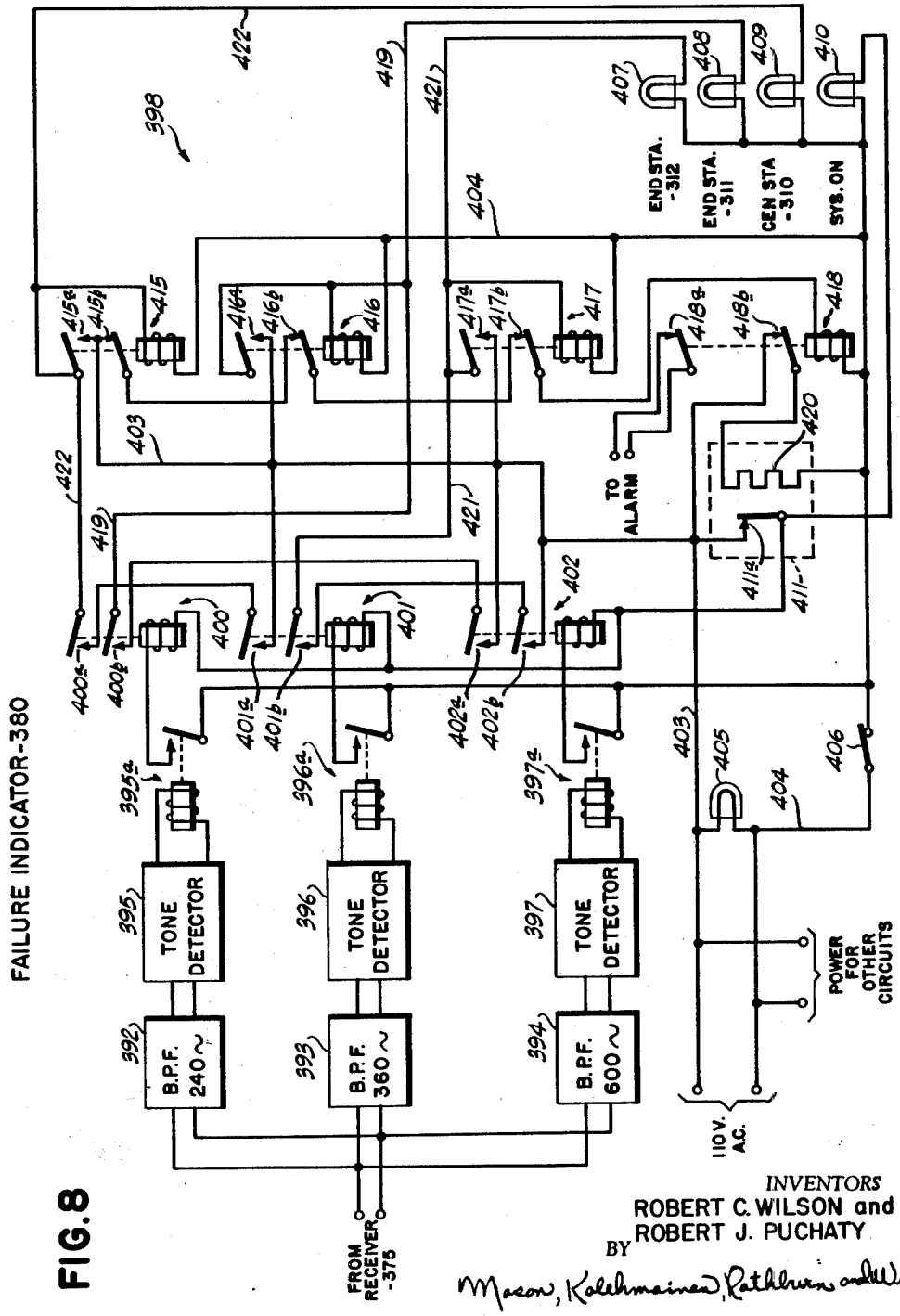

3,085,245
AUTOMATIC SWITCHOVER SYSTEM FOR RADIO TRANSMITTERS

Robert C. Wilson, Rockford, Ill., and Robert J. Puchaty, Tulsa, Okla., assignors to Seismograph Service Corporation, Tulsa, Okla., a corporation of Delaware
Original application Dec. 10, 1956, Ser. No. 627,398, now Patent No. 3,019,435, dated Jan. 30, 1962. Divided and this application Mar. 20, 1959, Ser. No. 800,845
7 Claims. (Cl. 343—227)

The present invention relates to radio position finding systems and more particularly to improvements in radio position finding systems employing phase comparison in pairs of position indication signals radiated from a plurality of spaced transmitting points to provide indications from which the position of a mobile receiving point relative to the known positions of the transmitting points may be determined. More specifically, the present invention is a division of copending application Serial No. 627,398, now U.S. Patent No. 3,019,435, filed December 10, 1956, and assigned to the same assignee as the present invention.

In systems of the particular type referred to, the continuous waves radiated from each pair of transmitters as received at the receiving point have a phase relationship which changes as a function of changing position of the receiving point between the two transmitting points. More specifically, the waves radiated by each pair of transmitting units of the system are characterized by spaced isophase lines which are hyperbolic in contour about the transmitting points as foci. On a line connecting the pair of transmitters, these isophase lines are spaced apart a distance equal to one-half the mean wave length of the radiated waves and have diverging spacings at points on either side of this line. With this system arrangement, the position of a receiving point relative to a pair of hyperbolic isophase lines may be determined by measuring the phase relationship between continuous waves radiated from the pair of transmitters.

Since the point of location of the receiving point along the zone separating the two isophase lines is not indicated by such a phase measurement, it is desirable to employ at least three spaced transmitters, different pairs of which function to provide a grid-like pattern of intersecting hyperbolic lines, in order to obtain absolute determination of the position of the receiving point. Systems of the character described are exceedingly accurate insofar as the position indications produced at the receiving point are concerned. To obtain the desired indication accuracy, however, it is necessary to maintain phase synchronization between the continuous waves radiated by the spaced transmitters, or, alternatively, so to arrange the system that phase shifts between the radiated waves are compensated during the phase comparing operation.

Phase synchronization of the waves radiated from the plurality of transmitters presents an exceedingly difficult problem which has been the subject of considerable development work. All solutions which have been found for this problem involve the use of relatively elaborate and somewhat delicate instrumentation not well adapted for the continuity of service required in position determining system. To obviate this problem, systems of the continuous wave hyperbolic type have been proposed (see Honore Patent No. 2,148,267, issued February 21, 1939), in which the phase shift problem is obviated by heterodyning the carrier waves of each pair of transmitters at a fixed link transmitting point, and modulating the difference frequency component of the heterodyned waves as a reference signal upon the carrier output of the link transmitter for radiation to the receiving point, where the difference frequency component is detected and phase compared with a difference frequency signal derived by directly heterodyning the transmitted continuous waves at the receiving point. In this manner, phase shifts between the continuous waves radiated from the two transmitters are completely compensated so that the measured phase angle is truly representative of the location of the receiving point between a pair of isophase lines.

One system which utilizes the principles of the Honore patent but which reduces the number of transmitting stations and frequency channels required is disclosed in United States Patent No. 2,513,316 to James E. Hawkins. In the system disclosed and claimed in the latter patent, a common link or reference transmitter is employed for modulating the reference signals developed upon a single space radiated carrier wave. Another arrangement which has been used to reduce both the amount of equipment and the number of frequency channels is disclosed and claimed in United States Patent No. 2,513,317 to James E. Hawkins and Robert S. Finn. In the system disclosed in the latter patent two of the position signal transmitters are alternately rendered effective as link or reference signal transmitters under the control of signals alternately radiated from a third position signal transmitter. While these systems provide satisfactory operation, it has been necessary, until the present invention, to maintain operating personnel at each of the transmitting stations in order to turn the equipment on or off whenever desired and to make certain that the equipment is functioning properly during use. Specifically, prior to the present invention, in order to turn on the equipment, it has been necessary to provide for voice communication, either by way of telephone lines or a radio transmitter between all of the transmitting stations, so that the operator at each station can be instructed to turn on his equipment. Obviously, the use of such a large number of operators materially increases the cost of system operation.

The present invention concerns a system in which all of the transmitting stations may be turned on from a single control station and, hence, the remaining stations may be said to be remotely controlled. In addition, the operation of the entire system may be monitored at a single point in such manner that, in the event of operational failure, the source of the trouble may be identified and maintenance personnel may immediately be dispatched to correct the difficulty. Thus, the present invention makes it possible to dispense with the use of operating personnel at all of the stations except the control station.

Accordingly, the principal object of the present invention is to reduce the number of persons required to maintain operation of a transmitting system of the hyperbolic, continuous wave type.

A further object of the present invention is to provide a transmitting system of the hyperbolic, continuous wave type which requires the continuous services of an operating crew at only one of the stations of the system.

It is also an object of the present invention to provide a transmitting system of the hyperbolic, continuous wave type in which the operation of the system is continuously monitored at a single station so that operational failures can be detected immediately.

Another object is to provide a transmitting system according to the preceding object in which the monitoring provides an indication of the source of the operational failure so that the trouble can be corrected without delay.

A further object of the invention is to provide a transmitting system of the hyperbolic continuous wave type in which uninterrupted operation of the system is assured by the provision of standby transmitting apparatus which is rendered effective automatically in the event of equipment failure.

It is likewise an object of the present invention to provide a transmitting system of the character indicated above having standby transmitters at certain or at all of the transmitting stations and having equipment for automatically rendering each of these standby transmitters operative in the event of failure of its associated transmitter.

It is also an object of the present invention to provide a system according to the preceding object in which the standby equipment is automatically rendered operative periodically even in the absence of equipment failure, thereby effecting longer operating life of the transmitters of the system.

The invention, both as to its organization and method of operation, together with further objects and advantages thereof, will best be understood by reference to the specification taken in conjunction with the accompanying drawings in which.

Figure 1:
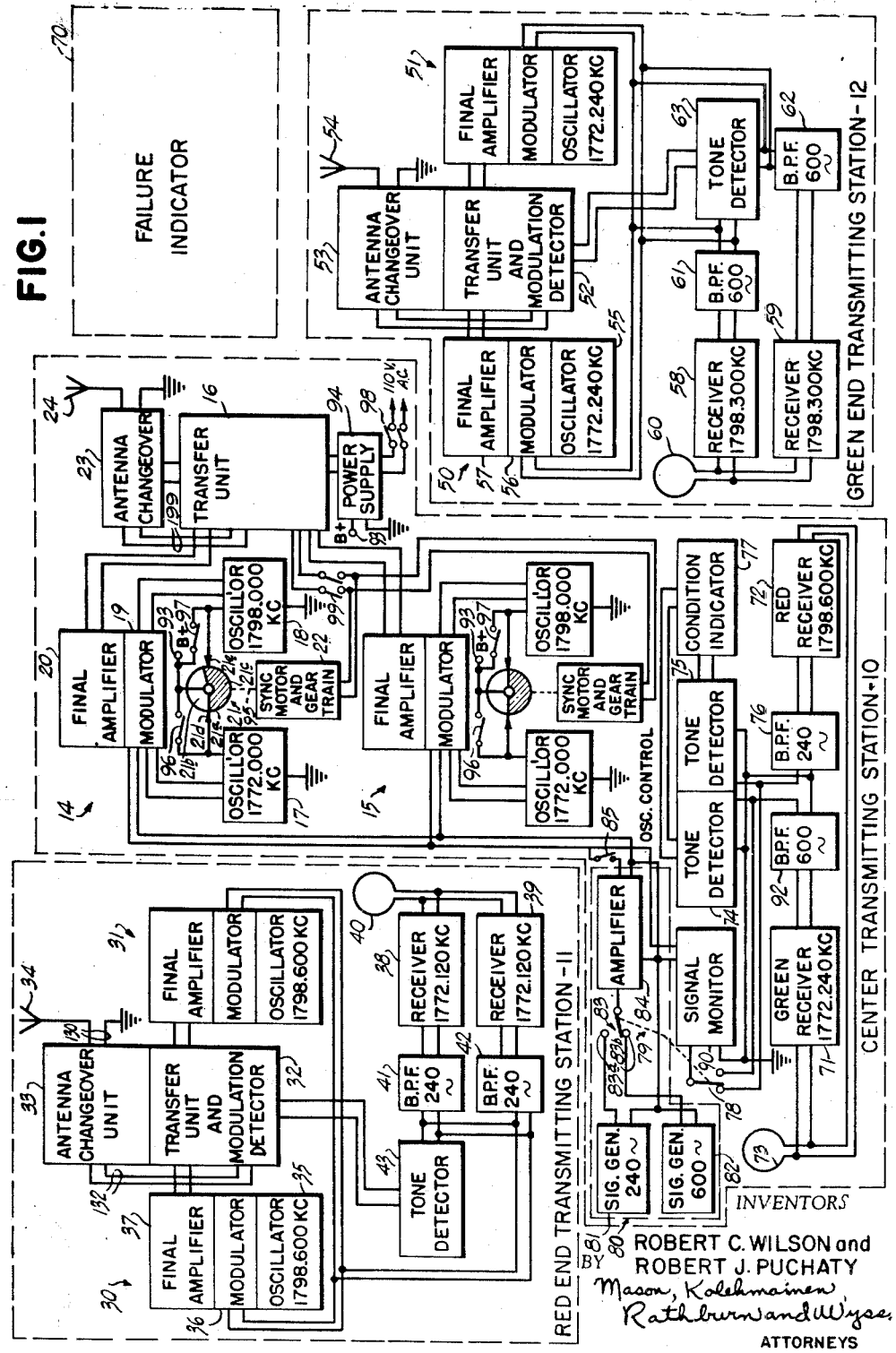
FIG. 1 is a diagrammatic representation of a three-foci transmitting system of the hyperbolic continuous wave type embodying the present invention.
Figure 4:
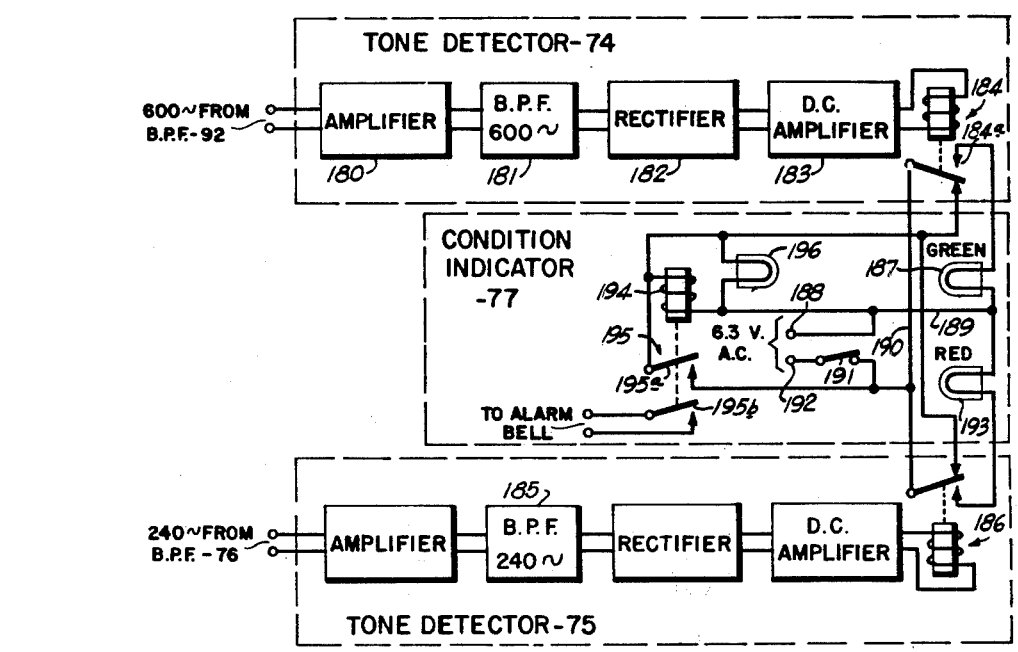
Figure 5:
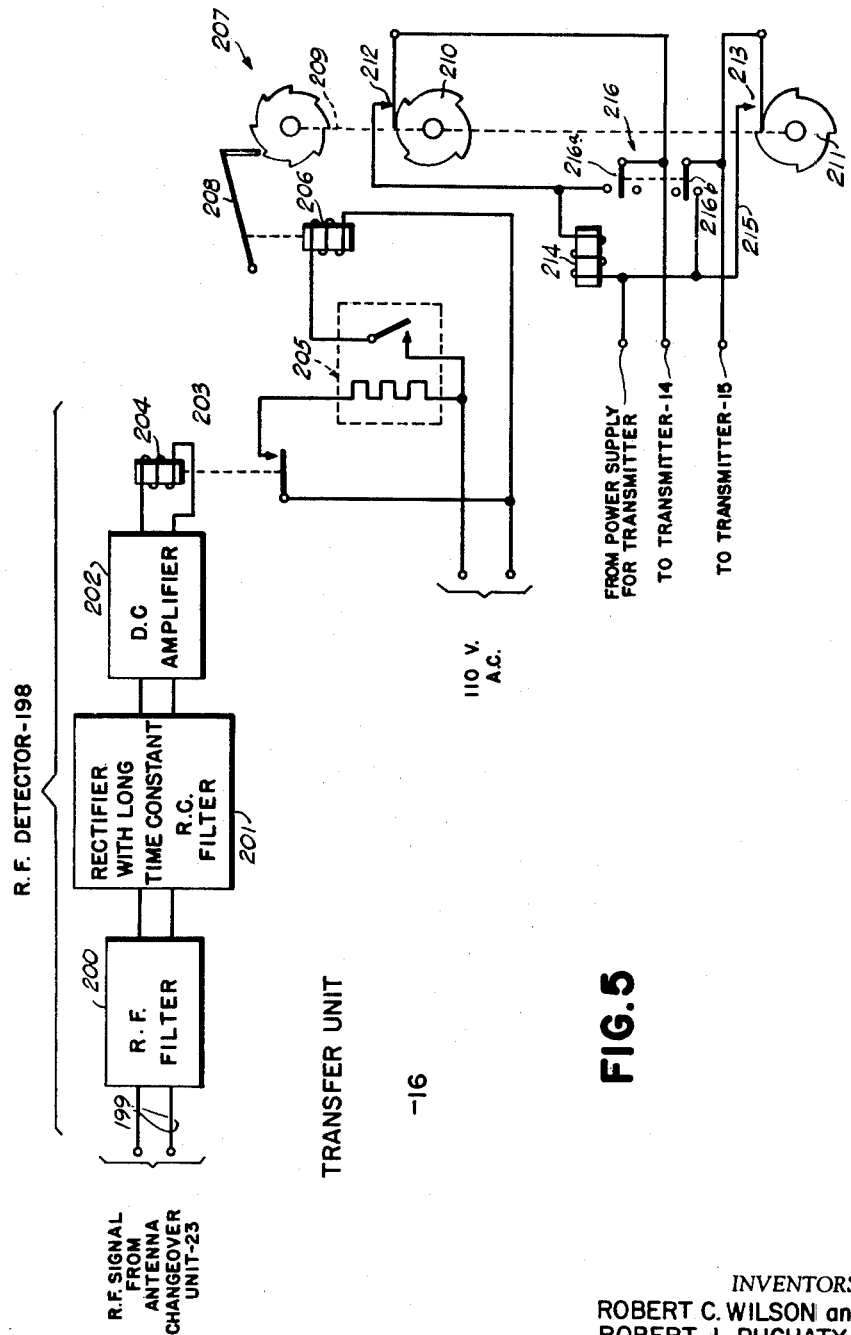
Figure 6:
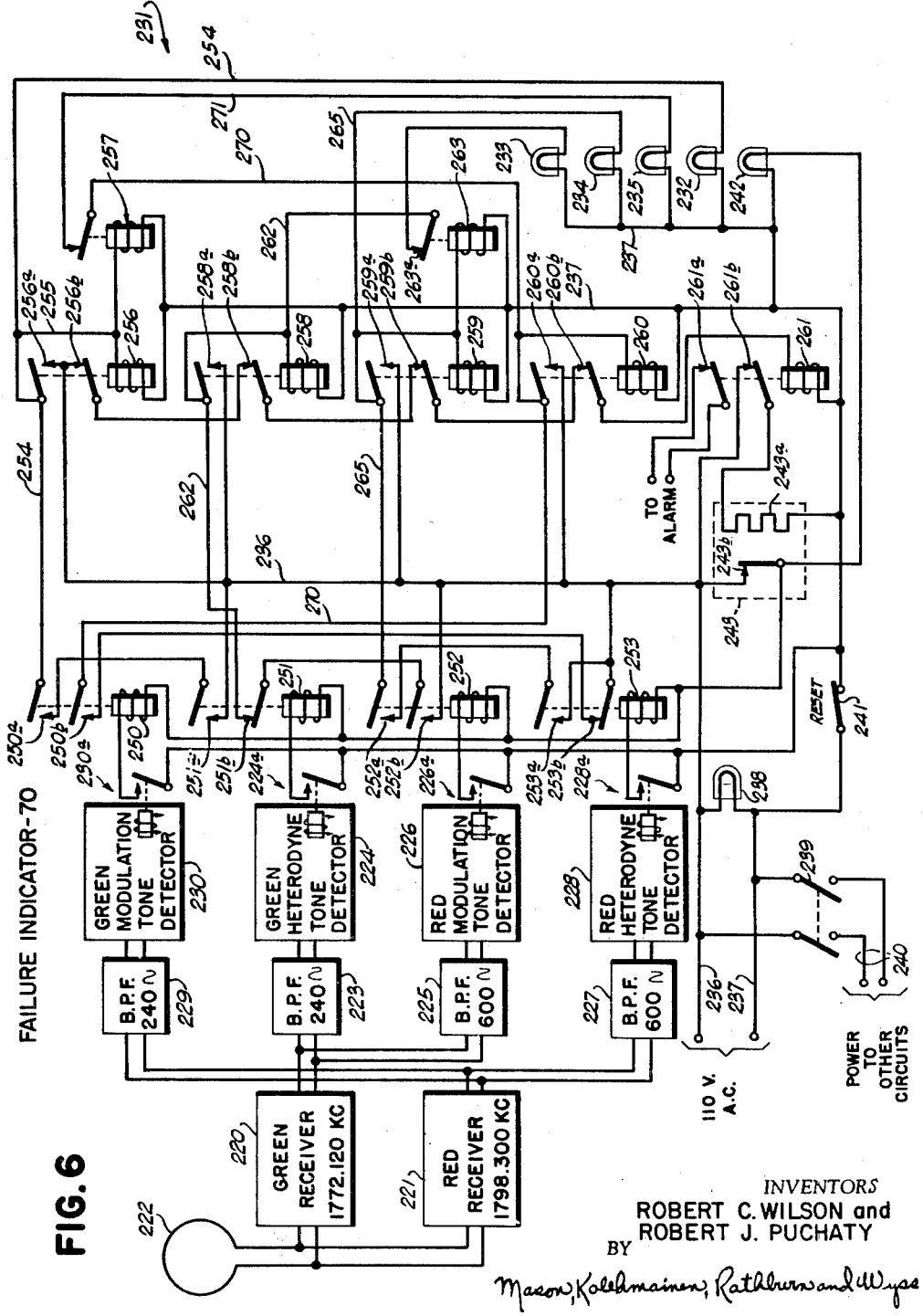
Figure 7:
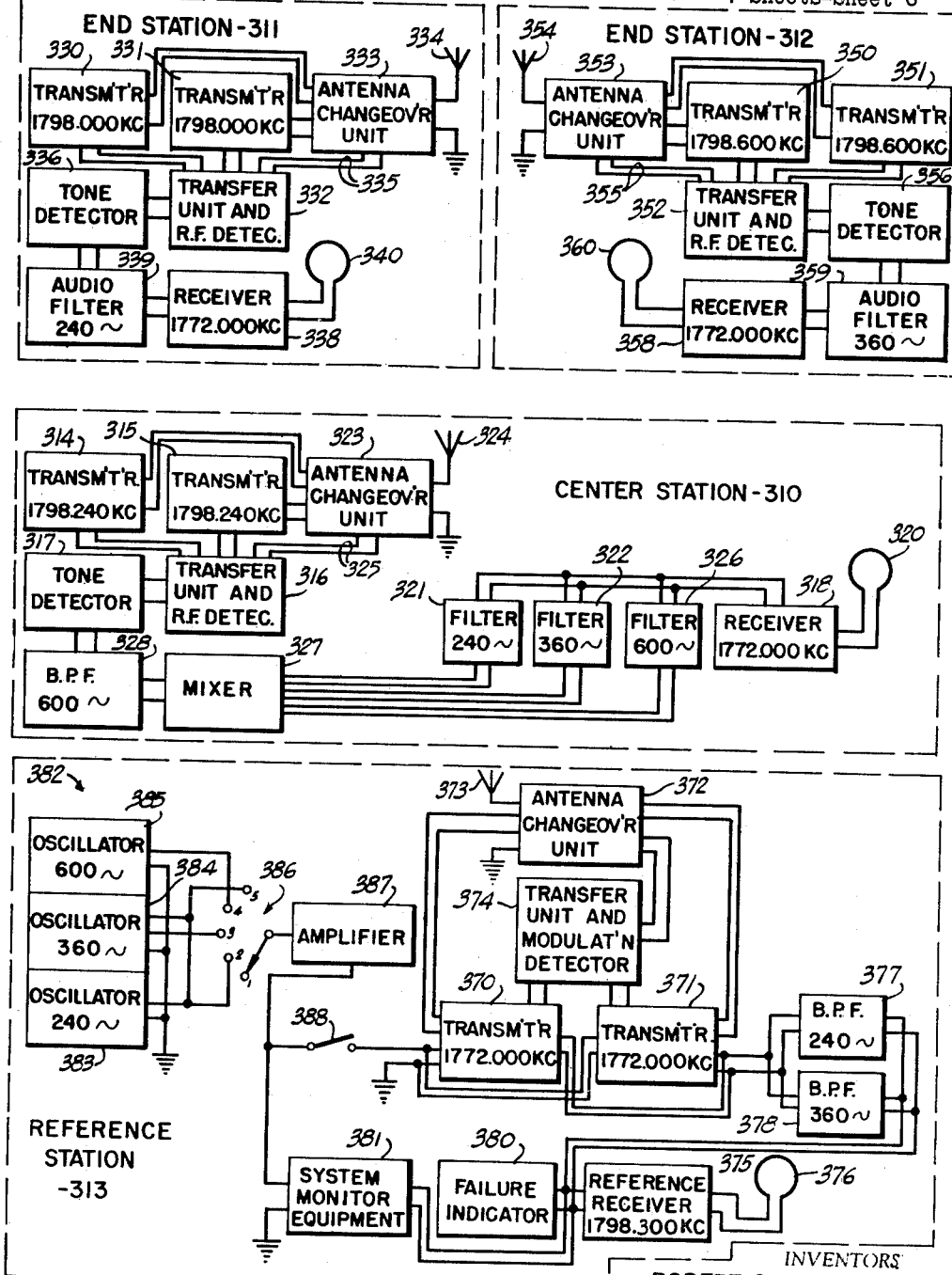

FIG. 4 diagrammatically illustrates the tone detector units and the condition indicator employed at the center transmitting station of the system illustrated in FIG. 1;

FIG. 5 is a diagrammatic representation of the transfer unit employed at the center transmitting station of the system illustrated in FIG. 1;

FIG. 6 is a diagrammatic representation of the equipment employed at the network office of the system illustrated in FIG. 1;

FIG. 7 is a diagrammatic representation similar to FIG. 1 but illustrating another embodiment of the present invention; and FIG. 8 diagrammatically illustrates the failure indicator circuit employed at the control station of the system shown in FIG. 7.

Referring now to the drawings, and, more particularly, to FIG. 1 thereof, the invention is there illustrated as embodied in a three-foci hyperbolic, continuous wave system for providing position information at any number of mobile receiving units (not shown) which may be carried by vessels or vehicles operating within the radius of transmission of a plurality of spaced apart transmitting units or stations 10, 11 and 12. The transmitting system illustrated in FIG. 1 is somewhat similar to that disclosed and claimed in the above identified U.S. Patent No. 2,513,317 to Hawkins and Finn but, of course, additionally includes the remote control and monitoring equipment of the present invention. Thus, the transmitting units 11 and 12 are spaced approximately equal distances from the location of the transmitting station 10 and, as a result, the transmitting station 10 may be referred to as a center transmitting station, while the stations 11 and 12 may be called end transmitting stations. To facilitate the ensuing description the end transmitting station 11 will at times be referred to as the RED end station and the receiving equipment designed to receive the waves radiated from this station will be termed a RED receiver while the end transmitting station 12 will be referred to as a GREEN station and the receiving equipment responding to the waves from station 12 will be termed a GREEN receiver. The stations 11 and 12 are so positioned that an imaginary base line interconnecting the points of location of units 10 and 11 is angularly related to an imaginary base line interconnecting the points of location of the units 10 and 12. As is more fully described hereinafter and as will be apparent from an understanding of the above identified Hawkins and Finn patent, the center transmitting unit 10 is equipped alternately to radiate a pair of position indicating signals so separated in frequency that they may be selectively received and distinguished. The end transmitting stations 11 and 12, on the other hand, are equipped continuously to radiate position indicating signals which are alternately modulated with reference signals developed in a manner described more fully hereinafter.

Specifically, the center transmitting station 10 comprises a first transmitter or transmitting unit indicated generally a 14 and a second transmitter or transmitting unit indicated generally at 15. Only one of these transmitters is employed at a particular time, the remaining transmitter being a standby or alternate unit which is automatically rendered effective by a transfer unit 16 in the event of transmitter failure at the center station. Since the transmitters 14 and 15 are identical, a description of one of these units is deemed to be sufficient. Thus, the transmitting unit 14 comprises a pair of oscillators or signal generators 17 and 18 respectively developing signals having frequencies of 1772.000 and 1798.000 kilocycles which are supplied through an amplitude modulator 19 to a final amplifier 20. The oscillators 17 and 18 are rendered alternately effective by alternately supplying plate voltage to the electron tubes of these oscillators. This aternate operation of the oscillators 17 and 18 may be effected by means of a commutator 21 which is driven from a synchronous motor and gear train 22, as fully described in the Hawkins and Finn patent referred to above. Thus, as illustrated in FIG. 1, the oscillators 17 and 18 are alternately keyed by alternately supplying anode current to their electron discharge tubes from the positive terminal 93 of a power supply 94 through a commutating ring 21a which is shaft-connected as indicated at 95 to be driven at constant speed by the synchronous motor and gear train unit 22. More specifically, the positive terminal 93 of the anode current source is connected to the conductive segment 21b of the commutating ring 21a, which segment spans slightly less than half the circumference of the ring. The remainder of the ring is composed of an insulating segment 21c. At diametrically opposed points on the periphery of the ring are provided brushes 21d and 21e which are respectively connected to positive conductors leading to the oscillators 17 and 18. Since the conductive segment 21b of the ring represents slightly less than half the periphery surface, it will be understood that a short off-signal period is provided between successive periods during which the oscillators 17 and 18 are alternately operated, thus preventing simultaneous radiation of the two waves developed by these oscillators. The periodicity with which the two oscillators are alternately operated is, of course, dependent upon the speed of rotation of the commutator ring, Preferably, this ring is driven at a speed of one revolution per second, such that the oscillators 17 and 18 are each rendered operative at one-half second intervals.

The oscillator 17 in the transmitter 14 and the corresponding oscillator in the transmitter 15 may also be turned on by means of a manually operated switch 96 which, when closed, bypasses the commutator and connects the terminal 93 directly to the electron discharge tubes of the oscillators. Similarly, a manually operated switch 97 is provided to bypass the commutator and turn on the oscillator 18 of the transmitter 14 and the corresponding oscillator of the transmitter 15. There is also provided an on-off switch 98 for controlling the delivery of A.C. current to the power supply 94 and to the remaining circuits at the center transmitting station 10. A switch 99 may be employed, if desired, to control the delivery of energizing voltage for the synchronous motor and gear train units of the transmitters 14 and 15. Thus, in order to render the center station effective to radiate continuously a 1772.000 kilocycle signal during calibration or testing of the equipment, the switches 96 and 98 are both closed. If, on the other hand, it is desired to radiate continuously a 1798.000 kilocycle signal from the center station for test purposes or for calibration, the switches 97 and 98 are both closed. To provide the normal operation of the center transmitting station 10 in which 1772.000 and 1798.000 kilocycle signals are alternately radiated in the manner described above, the switches 96 and 97 are left in their open position and the switches 98 and 99 are closed. The output signal from the final amplifier of each of the transmitters 14 and 15 is passed to the transfer unit 16 which selects the signal to be radiated and operates an antenna changeover unit 23 to pass the selected signal to an emitting antenna 24. The antenna changeover unit 23 samples the signal output of the unit 16 and supplies a signal to the unit 16 which informs the latter to switch to the standby transmitter in the event that signal output of the unit 16 disappears. In view of the foregoing description, it will be recognized that, regardless of which of the transmitters 14 or 15 is in operation, the center transmitting station 10 is effective alternately to radiate position indicating signals having frequencies of 1772.000 and 1798.000 kilocycles.

The equipment provided at the end station 11 includes a first transmitter 30 and a second transmitter 31, both of which are adapted to develop signals having a frequency of 1798.600 kilocycles. In the event of failure of one of the transmitters, the remaining transmitter, termed a standby transmitter, is adapted to be placed in operation automatically by means of a transfer unit and modulation detector 32 which functions to pass the signal developed by the operative transmitter through an antenna changeover unit 33 to a radiating or emitting antenna 34. Transmitters 30 and 31 are identical and each includes an oscillator or signal generator indicated by the reference numeral 35 in the transmitter 30. This oscillator develops signals having a frequency of 1798.600 kilocycles for passage through an amplitude modulator 36 and through a final amplifier 37 to the transfer unit and modulation detector 32. The antenna changeover unit 33 also samples the output signal of the end transmitting station 11 and supplies this sample to the unit 32 so that in the absence of transmission signal, the unit 32 will automatically render the standby transmitter effective.

For the purpose of developing reference signals which are alternately supplied to the modulator circuits of the transmitters 30 and 31, the end station 11 also comprises a pair of receivers 38 and 39 which are identical in construction, which are both tuned to a center frequency of 1772.120 kilocycles and which are both maintained in continuous operation, so that in the event of failure of one of the receivers the other receiver will continue to effect proper operation of the equipment at the end station 11. The receivers 38 and 39 are excited by signals picked up by a common loop receiving antenna 40 which is so oriented that signals radiated from the antenna 34 are nulled or eliminated, thereby minimizing receiver blocking problems which might otherwise result from the radiation of high power signals from a point relatively close to the receiving antenna. The signals arriving from the center station 10 and from the end station 12, of course, initiate a response in the antenna 40 and are passed to the signal input terminals of both of the receivers 38 and 39. The output of the receiver 38 is passed through a band pass filter 41 tuned to a frequency of 240 cycles, while the output of the receiver 39 is passed through a similar band pass filter 42. As will be described more fully hereinafter, the receivers 38 and 39 are adapted to heterodyne or beat the signals arriving from the center station 10 and from the end station 12 in order to develop the 240 cycle difference frequency therebetween, which difference frequency is, of course, passed through the filters 41 and 42 to the modulator circuits of the transmitters 30 and 31. The signals passed by the filters 41 and 42 are also applied to a tone detector circuit 43 where they function in a manner to be described more fully hereinafter to control the operation of the transfer unit and modulation detector 32 in order to permit the end transmitting station 11 to be turned on or off from a remote point.

The equipment provided at the end station 12 is similar to that at the end station 11, except, of course, for the frequency of operation of certain components of the transmitting and receiving circuits. Thus, the equipment at the end station 12 includes a first transmitter 50 and a second transmitter 51 which are identical in construction and which are adapted to be rendered effective one at a time under the control of a transfer unit and modulation detector 52. The signals developed by the effective transmitter are passed through an antenna changeover unit 53 to a radiating antenna 54. The antenna changeover unit 53 samples the output of the transmitting station 12 and supplies a signal to the unit 52 so that, in the absence of signal output from the station 12, the standby transmitter is rendered effective automatically. The transmitter 50, which, as indicated above, is identical to the transmitter 51, comprises an oscillator or signal generator 55 for developing signals having a frequency of 1772.240 kilocycles which are passed through an amplitude modulator circuit 56 and through a final amplifier 57 to the transfer unit and modulation detector 52.

For the purpose of heterodyning the signals received from the center station 10 and from the end station 11 to develop the reference signals referred to above, the end station 12 is provided with a pair of wave signal receivers 58 and 59 of identical construction, both center tuned to a frequency of 1798.300 kilocycles and both maintained in continuous operation. The input circuits of these receivers are each excited by the signals developed by a loop receiving antenna 60 which, of course, is so oriented that the signals radiated from the antenna 54 are nulled in order to eliminate or minimize the receiver blocking problems referred to above. The antenna 60 is, of course, excited by the signals arriving from the center station 10 and from the end station 11 and these signals are passed to the input of receivers 58 and 59. The receivers 58 and 59 are each adapted to heterodyne the signals received from the center station 10 and from the end station 11 and to develop the 600 cycle difference frequency therebetween. The latter difference frequency is passed through 600 cycle band pass filters 61 and 62 to the modulation circuits of the transmitters 50 and 51, where it is amplitude modulated upon the signal developed by the oscillator circuits of these transmitters. The signals passed by the filters 61 and 62 are also applied to a tone detector unit 63 for controlling the operation of the transfer unit and modulation detector 52 in order to permit the end station 12 to be turned on or off from a remote point as described below.

In view of the foregoing description, it will be recognized that either the transmitter 30 or the transmitter 31 at the end station 11 is rendered effective to cause continuous radiation of a single carrier wave signal having a frequency of 1798.600 kilocycles, either the transmitting unit 14 or the transmitting unit 15 at the center station is operative to radiate alternately signals having frequencies of 1772.000 and 1798.000 kilocycles, and either the transmitter 50 or the transmitter 51 at the end station 12 is effective to radiate continuously signals having a frequency of 1772.240 kilocycles. During the interval when the center station 10 is radiating its 1772.000 kilocycle signal, the receivers 38 and 39 at the end station 11 both heterodyne the signal from the center station with the signal continuously radiated from the end station 12 to develop a 240 cycle beat frequency which, as previously described, is passed through the filters 41 and 42 to the modulator circuit of the effective transmitter at the end station 11. Thus, the signal radiated from the end station 11 is alternately modulated with a 240 cycle reference signal. The loop receiving antenna 40 cooperates with the receivers 38 and 39 to prevent the appearance of the signal radiated from the end station 11 at the output of the receivers 38 and 39. The modulated carrier wave radiated by the end station 11 is, of course, accepted by the receivers 58 and 59 at the end station 12, but the 240 cycle reference signal has no effect on the operation of the end station 12 in view of the fact that it is rejected by the filters 61 and 62. This reference signal may, if desired, be reproduced at the end station 12 and used during installation of the system in calibrating to adjust the frequencies of the transmitters 50 and 51 for monitoring or for other similar purposes.

During the interval when the center transmitting station is effective to radiate signals having a frequency of 1798.000 kilocycles, the receivers 58 and 59 at the end station 12 heterodyne the signal received from the center station with the signal continuously radiated from the end station 11 in order to develop a 600 cycle beat frequency which is passed through the filters 61 and 62 to the modulating circuit of the effective transmitter at the end station 12. Thus, the signal radiated by the end station 12 is alternately modulated with reference signals having a frequency of 600 cycles. The latter reference signal appears at the output of the receivers 38 and 39 at the end station 11 and may be used for monitoring or calibration as described above, but it is prevented from affecting the operation of the end station 11 due to the fact that it is rejected by the filters 41 and 42.

The signals radiated from all three of the transmitting units 10, 11 and 12 are received at a mobile receiving unit of the type described in the above-identified Hawkins and Finn patent where the received signals are employed to develop a pair of position indications representative of the location of the mobile receiving unit relative to the three transmitting stations. Thus, as will be apparent from an understanding of the Hawkins and Finn patent, the reference signal modulated upon the carrier wave radiated from the end station 11, the carrier wave continuously radiated from the end station 12 and the 1772.000 kilocycle wave radiated from the center station 10 are employed to develop a first position indicated representative of the location of the mobile receiving unit relative to hyperbolic isophase lines having foci at the center station 10 and at the end station 12. Similarly, the 600 cycle reference signal modulated upon the carrier wave radiated from the end station 12, the carrier wave radiated from the end station 11 and the 1798.000 kilocycle wave radiated from the center station 10 are used to provide a position indication representative of the location of the mobile receiving unit relative to hyperbolic isophase lines having foci at the center station 10 and at the end station 11.

In addition to the two transmitting units 14 and 15 previously described, the center station 10 also includes means for monitoring the signals radiated from the transmitters to provide a continuous check on the operation of the systems, to enable the operator to evaluate the quality of emission and to facilitate frequency adjustment so that the desired audio beat frequencies can be maintained. Moreover, the center station includes apparatus for cooperating with the equipment at the end transmitting stations to effect remote control of the latter stations so that the entire transmitting system may be turned on from the center station without requiring the presence of operators at the two end stations. In addition, a monitoring station indicated by the reference numeral 70 may be employed either at the transmitting station 10 or at a location remote from all three of the transmitting stations, such as at the network office, to monitor the system in order to ascertain whether the equipment is functioning properly and to locate the source of trouble in the event that failure occurs.

Specifically, the center transmitting station 10 comprises, in addition to the equipment previously described, a pair of receivers 71 and 72 respectively tuned to frequencies of 1772.240 kilocycles and 1798.600 kilocycles, both of which are excited by signals received at a loop pickup antenna 73. The antenna 73 is, of course, oriented so that the signals emitted from the end stations 11 and 12 are accepted and applied across the signal input terminals of both of the receivers 71 and 72 while the signals emitted from the antenna 24 are nulled and eliminated. The receiver 71 is sufficiently selective to reject the 1798.600 kilocycle signal arriving from the station 11 while accepting the 1772.240 kilocycle signal arriving from the end station 12. The 600 cycle modulation component of the signal received from the end station 12 is reproduced by the receiver 71 and is passed through a band pass filter 92 to a pair of tone detector circuits 74 and 75. The receiver 72, on the other hand, is sufficiently selective to reject the signal received by the antenna 73 from the end station 12, but the signal received from the end station 11 is accepted and the 240 cycle modulation component thereof is reproduced and passed through a 240 cycle band pass filter 76 to the tone detectors 74 and 75. The tone detectors 74 and 75 are employed to control the operation of a condition indicator circuit 77, which indicates the absence of one or both of the signals from the filters 76 and 92. The signals passed by the filters 76 and 92 are also applied through one section 78 of an oscillator selector switch 79 to a signal monitor 90 described more fully below.

To provide for initiation of the operation of the end stations 11 and 12 from the center station 10, there is provided at the latter station an oscillator control circuit indicated generally at 80 for developing audio frequency signals to be modulated upon the wave radiated from the center station. This oscillator control circuit includes a pair of highly stable audio frequency generators 81 and 82 for developing signals having frequencies of 240 cycles and 600 cycles, respectively. The outputs of these two signal generators are respectively applied to spaced apart contacts 83a and 83b of section 83 of the switch 79. The switch 79 may be employed to apply the output of either the generator 81 or the generator 82 through an amplifier 84 and through a modulation on-off switch 85 to the modulator circuits of the transmitters 14 and 15. In addition, the switch 85 applies the output of the amplifier 84 to the signal monitor 90 where it is compared with the audio signal suplied through the switch section 78.

Essentially, the remote control equipment comprises means including the oscillator control circuit 80 for modulating the 1772.000 kilocycle signal radiated from the center station 10 with a 240 cycle tone switching signal, means at one of the end stations, for example, at the station 11 for receiving the switching signal and, after a predetermined time delay, turning on the end station 11, after which the end station 12 will be turned on automatically in response to the 1798.000 kilocycle signals alternately radiated from the center station and to the 1798.600 kilocycle signal emitted from the end station 11. The end station 12 may also be turned on by the modulation of a 600 cycle tone modulation signal upon the 1798.000 kilocycle signal radiated from the center station 10. The circuits at the end station are so designed that the tone switching signals must be applied throughout the predetermined "delay on" period, thus preventing the transmitting stations from being turned on by spurious noises or the like. However, the time constants of these circuits are such that the normal switching rate taking place at the center station and produced by the commutator 21 does not affect the operation. By proper use of the facilities provided, the center station operator may turn on either of the end stations without turning on the other for purposes of testing, calibration or the like, or he may turn on both of the end stations in order to place the entire transmitting system in operation. The end stations may also be turned off automatically merely by rendering the center station inoperative, thereby to terminate the development of tone signals at the end stations. Even after the tone signal development has ceased, the end stations remain on for a predetermined "delay off" period somewhat in excess of the "delay on" period for purposes developed more fully below.

Figure 3:
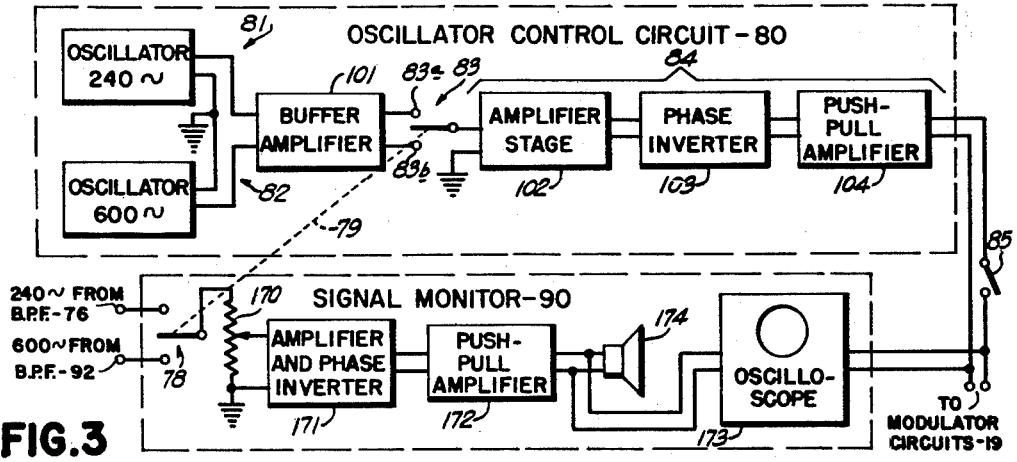
FIG. 3 is a diagrammatic representation of the oscillator control circuit and of the signal monitor unit employed at the center transmitting station of the system illustrated in FIG. 1.

Turning now to the oscillator control circuit 80 provided at the center station 10 for developing the tone switching signals referred to above and referring particularly to FIG. 3 of the drawings, it will be observed that this circuit includes a pair of audio oscillators 81 and 82. These oscillators are of the feedback type having a vibrating reed in the feedback circuit for stabiilzing the frequencies of the generated signals. As indicated above, the oscillator 81 is designed and adjusted to develop an audio frequency signal of 240 cycles, while the oscillator 82 develops an audio frequency signal of 600 cycles. To increase the stability of the oscillators and to immunize them from load changes, their outputs are applied through a conventional buffer amplifier 101 to section 83 of the oscillator selector switch 79. Specifically, the 240 cycle signal developed by the oscillator 81 appears between contact 83a of switch section 83 and ground, while the 600 cycle signal developed by oscillator 82 appears between contact 83b and ground. Thus, the movable arm or pole of switch section 83 may be selectively controlled to apply either the 240 cycle or the 600 cycle frequency to the amplifier 84. The latter amplifier comprises an input amplifier stage 102 having its signal input terminals connected to the movable arm of the switch section 83 and a phase inverter circuit 103 for developing push-pull signals for application to an output push-pull amplifier 104 of conventional construction. The signal output terminals of the push-pull amplifier 104 are connected through the modulation on-off switch 85 to the modulator circuits of both of the transmitters 14 and 15. The switch 85, when closed, is also effective to deliver the output signals of the push-pull amplifier 104 to the signal monitor 90 described more fully below. In view of the foregoing descripiton, it will be recognized that by the selective manipulation of the oscillator selector switch 79 the modulator circuits of the transmitters 14 and 15 may be supplied either with a 240 cycle tone switching signal or with a 600 cycle tone switching signal.

Figure 2:
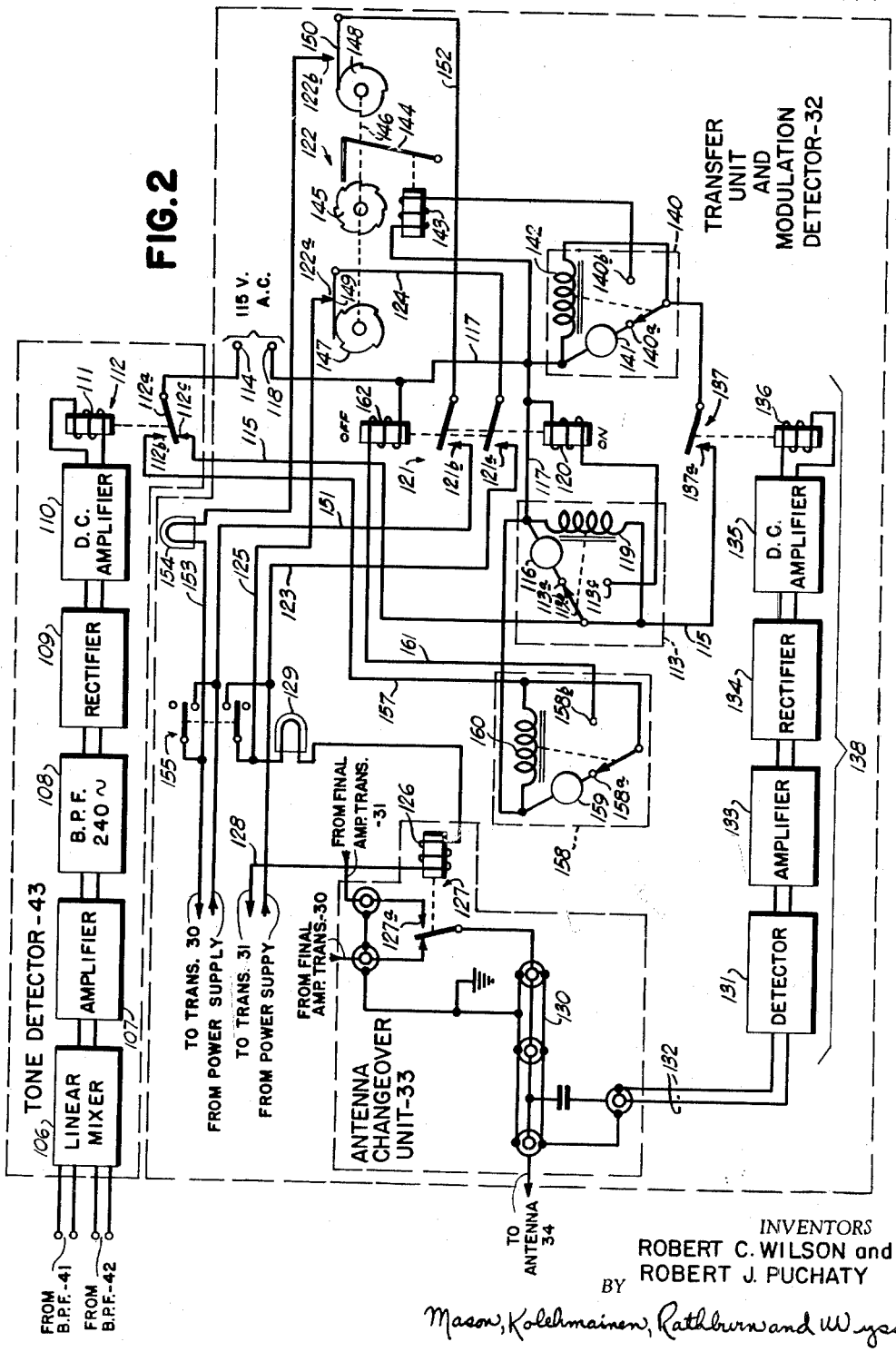
FIG. 2 is a diagrammatic representation of the tone detector, the antenna changeover unit and the transfer unit and modulation detector employed at one of the end transmitting stations of the system illustrated in FIG. 1.

Let it be assumed for the present that it is desired to turn on the end station 11 while, at the same time, maintaining the end station 12 in its inoperative condition. Such a condition might be desirable for purposes of monitoring the end station 11 or to facilitate frequency adjustment and the like. To effect the desired result, the oscillator selector switch 79 is so manipulated that the signal appearing between contact 83a of switch section 83 and ground is applied to the input of the amplifier 84, the modulator on-off switch 85 is closed, the oscillator control switch 96 is closed and, of couurse, the main power on-off switch 98 is closed while switches 97 and 99 remain open. In this manner the center station is rendered effective continuously to radiate a 1772.000 kilocycle carrier wave which is modulated by the 240 cycle signal developed by the oscillator control circuit 80. This modulated carrier wave signal is, of course, rejected by both of the receivers 58 and 59 at the end transmitting station 12 and, hence, has no effect on the operation of the latter station. The 240 cycle audio switching signal is, however, reproduced by both of the receivers 38 and 39 at the end transmitting station 11 and is passed through filters 41 and 42 to the tone detector circuit 43. As previously mentioned, both of the receivers 38 and 39 are maintained in operation continuously so that each will be conditioned to receive the signal from the center station. The two signals passed by the filters 41 and 42 are applied as illustrated in FIG. 2 to separate sets of signal input terminals of a linear mixer circuit 106 in the tone detector 43. The linear mixer circuit functions to mix the two input signals without developing sum and difference frequencies and passes both of the 240 cycle signals to an amplifier circuit 107. The output of the latter amplifier is passed through a 240 cycle audio band pass filter 108 to a half-wave rectifier circuit 109. The latter rectifier circuit clips off the positive half-cycles of the 240 cycle input signal and passes the negative half-cycles through a resistance-capacitance filter network to the control grid of a D.C. amplifier 110. The time constant of this resistance-capacitance filter network, as described more fully below, is sufficient to maintain the negative signal on the grid of amplifier 110 during a period corresponding to the normal switching rate effected by the commutators in the transmitters 14 and 15 at the center station. The negative signal applied to the control grid of the D.C. amplifier 110 is sufficient to cut off the plate current of this amplifier and, since this plate current flows through the operating coil 111 of a tone detector relay 112, it will be apparent that whenever 240 cycle signals are passed by the filter 108, the relay 112 is opened or de-energized. The audio filter 108 in the tone detector prevents spurious signals or interference from opening the tone detector relay and effectively prevents opening of this relay except during periods when a 240 cycle tone signal is being developed by receivers 38 and 39. The linear mixer 106 in the input of the tone detector circuit allows the relay 112 to be opened when a signal is developed either by the receiver 38 or the receiver 39. Thus, the tone detector 43 will respond to a 240 cycle signal developed by either one of these receivers, even though the other receiver may be ineffective due to operational failure or the like. In any event, prior to the development of the 240 cycle switching signal by the receivers 38 and 39, the D.C. amplifier 110 is in a conducting state and its plate current flow energizes the relay 112 to hold pole 112a in engagement with stationary contact 112b. As soon as a 240 cycle signal is developed by either of the receivers 38 and 39 as, for example, by reproducing the 240 cycle tone switching signal modulated upon the 1772.000 kilocycle wave being continuously radiated from the center station 10 under the described conditions, the relay 112 opens and pole 112a drops into engagement with a normally closed contact 112c, thereby applying voltage to a time delay relay 113 which may be referred to as the "delay on" relay. Specifically, when the relay 112 is opened, one terminal 114 of an alternating current source is connected through the relay 112, through a signal connector 115, through the normally closed contact 113a of the time delay relay 113 to a time delay motor 116 or the like in the relay 113. The other side of the time delay motor 116 is permanently connected through a conductor 117 to the second terminal 118 of the A.C. source.

Thus, as soon as relay 112 opens, the time delay motor is energized and the timing cycle of the "delay on" period begins to run. After a predetermined delay which, in accordance with a particular installation of the present invention, is set at 60 seconds, the operating coil 119 of the relay 113 becomes energized to move the pole 113b of the relay into engagement with normally open contact 113c, thereby applying the line voltage across the operating coil 120 of a latching relay 121. The latter relay is of the type having its contacts mechanically latched both in the open and closed positions and, hence, the relay contacts remain closed. The time delay relay 113 is of the instantaneous reset type, so that if the signal supplied to the D.C. amplifier 110 is terminated during the "delay on" period for a period of time in excess of the time constant of the RC network in the input circuit of this amplifier, the relay 112 is closed and the relay 113 is reset so that the timing cycle must be re-initiated. The instantaneous reset feature of the relay 113 thus prevents short or intermittent spurious signals such as static or the like from operating the latching relay 121. When the coil 120 of the latching relay is energized, contacts 121a and 121b are closed to complete a circuit through a ratchet relay 122 to one of the transmitters 30 or 31 at the end station 11. The condition or position of the ratchet relay will, of course, determine which one of the transmitters is turned on initially. Thus, for example, when the ratchet relay is positioned as illustrated in FIG. 2, the power supply for the transmitter 31 is delivered through a bus conductor 123, through the now closed contact 121a, through a connector 124, through closed contact 122a of the ratchet relay, through a signal connector 125, through a signal light 129 for indicating that transmitter 31 is on, through the operating coil 126 of an antenna changeover relay 127 and through a connector 128 to the plate and screen circuits of the electron discharge tubes of the transmitter 31. Plate voltage is not delivered to the electron discharge tubes of the transmitter 30, in view of the fact that contact 122b of the ratchet relay 122 is open. The flow of current through the operating coil 126 of the antenna changeover relay closes contact 127a and connects the output of the final amplifier of the transmitter 31 through a coaxial cable 130 to the antenna 34.

With the circuits of the transmitter 31 energized, the 240 cycle signal reproduced by either or both of the receivers 38 and 39 is passed to the modulator circuit of the transmitter 31, where it is amplitude modulated upon the carrier wave radiated from the antenna 34. A portion of the signal supplied to the antenna 34 is applied through a suitable coupling circuit or sampling means to a modulation detector circuit indicated generally at 138. This coupling circuit may comprise a small capacitor connected to the inner conductor of the coaxial cable 130 for supplying signals through a connector 132 to the signal input circuit of a detector 131 at the input of circuit 138. The latter detector is of conventional construction and functions to demodulate the input signal and to reproduce the 240 cycle modulation component which is passed through a transformer coupled amplifier 133 to a half-wave rectifier 134. The rectifier 134 is similar to the rectifier 109 described above and functions to eliminate the positive half-cycles and to pass the negative half-cycles of the 240 cycle signal to the control grid of a D.C. amplifier 135. The latter amplifier, like the amplifier 110 described above, includes in its input circuit a resistance-capacitance network having a time constant sufficient to maintain the negative voltage during the normal switching rate of the transmitting system. The negative voltage supplied by the rectifier 135 has a magnitude sufficient to cut off the amplifier 134 whenever signals are supplied to the cable 130. Thus, when the 240 cycle signal is modulated upon the wave radiated from end station 11, the amplifier 135 is cut off and the plate current flow to the operating coil 136 of a modulation detector relay 137 is terminated. Thus, before the latching relay 121 has been energized to turn on one of the transmitters at the end station 11 the amplifier 135 is in a conducting state, the relay 137 is actuated and its contact 137a is closed. As soon as a 240 cycle signal is reproduced at the end station 11 to operate the relay 112, current is passed through the connector 115, through the normally closed contact 137a, through the normally closed contact 140a of a time delay relay 140 and through the timing motor 141 of the time delay relay to the connector 117. Thus, as soon as the tone detector relay 112 is opened incident to signal reception at the end station 11, the cycle of the timing motor 141 is initiated. The time delay effected by the relay 140 is considerably less than that provided by the "delay on" relay 113 and, in accordance with a particular embodiment of the present invention, is adjusted to 5 seconds. Thus, at the end of the 5 second delay period the operating coil 142 of the relay 140 is energized to close the normally open contact 140b in order to apply line voltage across the operating coil 143 of the ratchet relay 122. Actuation of the coil 143 draws an operating pawl 144 into engagement with the teeth of a ratchet wheel 145 to advance the relay 122 one step. The ratchet 145 is fixedly mounted on a shaft indicated at 146 which also carries a pair of switch operating cams 147 and 148 having cam teeth which are so spaced that the contacts 122a and 122b will each be alternately opened and closed as the ratchet relay is advanced. Specifically, when the operating coil 143 is actuated to advance the ratchet relay from the position illustrated in FIG. 2, the contact 122a will be opened, due to the fact that movable arm 149 will drop into one of the recessed regions on the periphery of the cam 147. At the same time, contact 122b is engaged by arm 150, due to the fact that this arm is moved radially outward by engagement with a toothed region on the cam 148. When the contact 122a is opened, of course, the plate voltage supply to the electron discharge tubes of the transmitter 31 is interrupted and this transmitter is, of course, rendered ineffective. Closing of the contact 122b conditions the plate supply circuit for the transmitter 30 to be completed as soon as the latching relay 121 is operated at the completion of the "delay on" period effected by the relay 113. Thus, at the start of each turn-on period at the end transmitting station 11, the ratchet relay 122 is operated to transfer from one of the transmitters 30 or 31 to the other transmitter. In this manner, extended use of a signal transmitter over a long period of time is prevented and the operating life of each of the transmitters 30 and 31 is lengthened.

Some time after the ratchet relay 122 has been operated in the manner described above, the timing cycle of the "delay on" relay 113 will be completed to operate the latching relay 121 in the manner described above, whereupon a circuit will be completed from bus conductor 151 through the now closed contact 121b, through a connector 152, through the now closed contact 122b of the ratchet relay 122, through a signal light 154 and through a signal connector 153 to the plate and screen grid circuits of the electron discharge tubes of the transmitter 30, thereby to place the latter transmitter in operation. The on condition of the transmitter 30, of course, is indicated by illumination of the signal light 154.

During calibration or for test purposes, the transmitters 30 and 31 may be turned on manually at the end station by means of a switch 155 which effectively bypasses the time delay circuits and the various relays described above. Specifically, when the switch 155 is moved to a downward position, illustrated in FIG. 2, a direct connection is provided between conductor 151 and conductor 153, thereby delivering plate voltage to the tubes of the transmitter 30 to place the latter transmitter in operation. During this time, of course, the transmitter 31 is not operated due to the fact that the lower section of the switch 155 is confronted by an open circuit condition. Under these conditions, the antenna changeover relay 127 is not energized and the output of transmitter 30 is connected to the antenna circuit. When, however, the switch 155 is moved to the upper position illustrated in FIG. 2, the connection between conductor 151 and conductor 153 is broken and the conductors 123 and 125 are connected directly together to deliver plate voltage to the tubes of the transmitter 31. Under the latter conditions, the antenna changeover relay 127 is operated to transfer the antenna circuit connection from the output of the transmitter 30 to the output of the transmitter 31.

To summarize briefly the turn-on procedure described above, it will be observed that the presence of the 240 cycle tone switching signal at the output of either of the receivers 38 or 39 operates the tone detector circuit to close the relay 112. The latter operation starts the time delay relays 113 and 140. At the end of a delay period of a few seconds, the relay 140 is effective to operate the ratchet relay 122 and condition the operating circuits for the transmitters 30 or 31. Some time later, the "delay on" relay 113 is effective to energize the latching relay 121 and complete the connection to one of the transmitters 30 or 31 through the ratchet relay 122. Thus, each time the end station 11 is turned on, the ratchet relay 122 and its associated circuitry are effective to transfer from one of the transmitters 30 or 31 to the other transmitter. When the latching relay 121 has been energized and one of the transmitters 30 or 31 has been placed in operation, the antenna changeover relay 127 is automatically rendered effective to connect the antenna circuit to the energized transmitter.

When the station 11 has been turned on, the modulation detector circuit 138 opens the relay 137 to break the circuit to the relay 140. The relay 137 remains open as long as a modulated signal is present on the cable 130 and, hence, the circuit at the end station will remain at the described position. If, however, the signal on the cable 130 disappears as, for example, by failure of the effective transmitter at the end station 11, the negative voltage supplied to the control grid of the D.C. amplifier 135 disappears to render this tube conducting and to close the modulation detector relay 137. At this time it will be remembered that a 240 cycle signal is still present at the output of the receivers 38 and 39 and, hence, tone detector relay 112 remains open. As soon as relay 137 is closed, the timing motor 141 of the time delay 140 is energized. If, during the delay period provided by the relay 140, the equipment failure is corrected, that is, if the trouble occurred as a result of momentary power failure or the like at the station 11, the relay 137 is immediately opened and the time delay relay 140 reverts to its original condition without having any effect on the operation of the ratchet relay 122 or the other circuits illustrated in FIG. 2. If, however, the failure does not correct itself within the delay period provided by the relay 140, the relay operating coil 142 is energized to close contact 140b, thereby to advance the ratchet relay 122. The latching relay 121 is, of course, closed at this time and, accordingly, the advancement of the ratchet relay immediately places the standby transmitter in operation, thereby automatically energizing the standby transmitter in the event that the effective transmiting equipment fails.

When it is desired to turn off the end transmitting station 11, the operator at the center station may remove he 240 cycle modulation signal as, for example, by opening the modulation on-off switch 85. When this modulation is removed, the output from the receivers 38 and 39 is interrupted and the D.C. amplifier 110 is no longer excited by negative signals from the rectifier 109. Therefore, the amplifier 110 begins to conduct and its plate current flow energizes the relay 112 to close contact 112b in order to complete a connection through conductor 157 and through normally closed contact 158a of a "delay off" time delay relay 158 to the timing motor 159 of the latter relay. The "delay off" period effected by the relay 158 is considerably longer than the "delay on" period provided by the relay 113 and, in accordance with a particular installation of the present invention, this delay period was selected at 90 seconds. During this "delay off" period the end transmitting station 11 remains in operation so that if the absence of signal output at receivers 38 and 39 is due to a momentary failure of the equipment either at the center transmitting station 10 or at the end transmitting station 11, the operation of the end transmitting station can be resumed as soon as the momentary failure is corrected. Thus, in the event that 240 cycle signals are again produced by either of the receivers 38 or 39 during the 90 second "delay off" period, the relay 112 is again opened and the "delay off" relay 158 reverts to its normal position, illustrated in FIG. 2. The "delay off" circuit thus prevents the transmitting equipment at the end station 11 from shutting down in case of momentary power failure at the end station 11, thereby to provide a period of time sufficient for automatic starting type generators to pick up the load and correct the power failure. In addition, the "delay off" circuit holds the end station 11 on the air for a period of time which is sufficient to allow the entire system to be placed into operation during a complete turn-on period as described below. At the end of the "delay off" period, the operating coil 160 of the relay 158 is energized to close contact 158b and, hence, to energize the "turn off" operating coil 162 of the latching relay 121 via conductor 161. Energization of the coil 162 releases the mechanical latch holding the movable arms of the relay 121 in the down position and draws these arms upwardly, thereby interrupting both of the circuits supplying power to the transmitters 30 and 31. Thus, both of these transmitters are rendered inoperative and the end station 11 goes off the air.

The equipment provided at the end transmitting station 12 to effect the automatic transfer between the transmitters 50 and 51 and to provide the remote control operation is similar to the equipment just described at the transmitting station 11. Thus, the tone detector 63 is identical to the tone detector 43 just described except, of course, that the audio filter in the detector 63 is tuned to pass signals having a frequency of 600 cycles, while the audio filter 108, as indicated above, passes 240 cycle signals. The frequencies of operation of the remaining circuits at the end station 12 are changed in similar manner. Therefore, in the event that it is desired to turn on the end station 12 for test purposes or for calibration while, at the same time, maintaining the end station 11 in inoperative condition, the operator at the center station may leave switches 96 and 99 open, close the main power on-off switch 98, close the manually operated switch 97, close the modulation on-off switch 85 and place the oscillator selector switch 79 in position to deliver 600 cycle signals from the oscillator control circut 80 through the amplifier 84 to the modulator circuits of the transmitters 14 and 15. In this manner the center station 10 is rendered effective continuously to radiate a 1798.000 kilocycle carrier wave amplitude modulated with a 600 cycle switching signal. This signal is received by the antenna 60 and is passed to the receivers 58 and 59 where the 600 cycle modulation component is detected and passed through filters 61 and 62 to the tone detector 63. The tone detector 63 responds to the input signal by opening its tone detector relay in order to turn on the transmitting equipment at the end station 12 in exactly the same manner as the turn-on procedure which takes place at the end transmitting station 11 and which has been described previously. The end transmitting station 12 is, of course, turned off by removing the 600 cycle tone switching signal modulated upon the carrier wave radiated from the center station as, for example, by opening the modulation on-off switch 85. In the absence of signal output at both of the receivers 58 and 59, the tone detector relay is closed and the transmitting station 12 is turned off in exactly the same manner as the turn-off procedure employed at the end station 11. The transfer unit and modulation detector 52 is supplied with a sample output from the antenna changeover unit 53 in order to effect automatic transfer to the standby transmitter in the event of operational failure of the main transmitter in the manner previously described. Also, the unit 52 is effective to transfer from one of the transmitters 50 or 51 to the other transmitter each time the end station equipment is turned on in order to instrument the transmitter equipment-sharing feature previously described.

Assuming that the transmitting station 11 has been turned on in the same manner described above by continuously radiating from the center station 10 a 1772.000 kilocycle signal modulated with a 240 cycle tone detector signal, the 240 cycle signal modulated on the wave radiated from the end station 11 is detected and is passed through the band pass filter 76 and through section 78 of the modulation on-off switch 79 to the signal monitor 90 in the manner illustrated in FIG. 3. Specifically, with both sections of the switch 79 in their upper position, illustrated in FIG. 3, the output of the band pass filter 76 is developed across a gain control potentiometer 170. This potentiometer may be varied to control the amplitude of the input signals supplied to an amplifier and phase inverter unit 171 which develops push-pull signals for exciting a conventional push-pull amplifier 172. The output of the push-pull amplifier 172 is applied to one set of deflection plates of an oscilloscope 173, the other pair of deflection plates of which are excited by the signal output of the push-pull amplifier 104 supplied through switch 85. Thus, a lissajous pattern is produced on the screen of the oscilloscope in response to the two 240 cycle signals respectively applied to its horizontal and vertical plates. As previously indicated, the 240 cycle signal developed by the oscillator 81 is highly stable and, hence, serves as a frequency standard. Thus, the lissajous pattern may be observed by the operator at the center station 10 to make certain that the transmitting equipment at the end station 11 is functioning properly and also to facilitate calibration and frequency adjustment of the transmitting equipment at the center station. The output of the push-pull amplifier 172 may also be applied to a loudspeaker or the like in order to produce a continuous 240 cycle tone which indicates that the end station 11 has been turned on and that a modulated carrier wave is being received from this station.

Similarly, when the end station 12 has been turned on by continuously radiating from the center station 10 a 1798.000 kilocycle carrier wave amplitude modulated with a 600 cycle signal in the manner previously described, the modulated wave radiated from the antenna 54 is received by the receiver 71 at the center station 10. The latter receiver detects the 600 cycle modulation component and passes it through the band pass filter 92 and through section 78 of the oscillator selector switch 79 to the signal monitor unit 90. Specifically, with both sections of the switch 79 in their lower position, as illustrated in FIG. 3, the output of the filter 92 is applied across the gain control potentiometer 170 and is passed through the amplifier and phase inverter unit 171 and through the push-pull amplifier 172 to the oscilloscope 173 where it is compared with the highly stable 600 cycle signal developed by the oscillator 82. Obviously, the 600 cycle signal appearing at the output of the push-pull amplifier 172 is also applied to the loudspeaker 174 to indicate that the end station 12 is on the air and that the receiver 71 is receiving its amplitude modulated carrier wave.

In the event that the signal monitor 90 indicates that the end transmitting station being monitored has failed to come on the air, it is only necessary to remove the tone switching signal by opening the switch 85 for a period of several seconds, for example, 10 seconds, and then to reapply the modulation by again closing the switch. When the tone switch signal is removed for a 10 second period, the tone detector relay in the tone detector at the end station closes. This breaks the circuit to the time delay relays 113 and 140 and, accordingly, when the tone switching signal is reapplied at the end of the 10 second interval, the relay 112 opens to apply a signal through the closed contacts of switch 137 to the time delay relay 140. Obviously, the relay 137 is closed, in view of the fact that the end station 11 has failed to come on the air. After the delay period produced by the relay 140, the ratchet relay 122 is advanced to condition the transmitter transfer circuits so that at the completion of the delay cycle effected by the relay 113 the operation will be automatically transferred to the standby transmitter. The operator at the center station can then dispatch a maintenance crew to repair the inoperative transmitter so that both of the transmitters at the end stations will again be ready for operation.

In the event that it is desired to turn on both of the end stations 11 and 12 to place the entire system in operation, the center station 10 is rendered effective alternately to radiate its two carrier waves of 1772.000 kilocycles and 1798.000 kilocycles and one of these waves is modulated with a tone switching signal supplied by the oscillator control circuit 80. To effect this operation, the operator closes the switches 98 and 99 and leaves the switches 96 and 97 open. If it is desired to initiate operation by turning on the end transmitting station 11, the oscillator selector switch 79 is positioned to supply a 240 cycle signal through the amplifier 84 and through the closed switch 85 to the modulator circuits of both of the transmitters 14 and 15. The commutator 21, as previously described, is effective to render the oscillators of these transmitters alternately operative to develop the two carrier wave signals. The 240 cycle signal supplied from the amplifier control circuit 80 is thus modulated upon both of the radiated signals. The 240 cycle signal modulated upon the 1798.000 kilocycle wave is reproduced by the receivers 58 and 59 at the end station 12 but is rejected by both of the filters 61 and 62 and, hence, has no effect on the operation at this end station. The 240 cycle signal modulated upon the 1772.000 kilocycle wave radiated from the center station is reproduced by the receivers 38 and 39 at the end station 11 and is passed through the filters 41 and 42 to the tone detector 43 in order to turn on the end station 11 in the manner described above. While the 240 cycle signal appears at the output of the receivers 38 and 39 only during the alternate intervals of operation of the center transmitting station 10, as described above, the resistance-capacitance network at the input circuit of the D.C. amplifier 110 in the tone detector 43 holds over for this switching period and, hence, maintains the tone detector relay 112 in its open position as long as the tone switching signal is being received. As soon as the transmitting station 11 is placed on the air to radiate its 1798.600 kilocycle signal, the receivers 58 and 59 at the end station 12 heterodyne the signal continuously radiated from the end station 11 with the 1798.000 kilocycle signal alternately radiated from the center station 10 to develop a 600 cycle signal which is passed through the filters 61 and 62 to operate the tone detector relay 63 in the manner indicated above, thereby placing the end transmitting station 12 on the air. When the end station 12 is placed in operation the receivers 38 and 39 at the end station 11 function to develop the 240 cycle beat frequency between the signal continuously radiated from the end station 12 and the 1772.000 kilocycle signal alternately radiated from the center transmitting station 10. Thus, the tone switching signal developed by the oscillator 80 can be now removed by opening switch 85 and the outputs of receivers 38 and 39 at station 11 and of receivers 58 and 59 at station 12 will maintain the end stations in operation. As previously indicated, in the event of transmitter failure of a momentary nature at one of the end stations, the "delay off" relay 158 in the tone detector circuits at the end stations holds the transmitter of the other end station on the air so that if the failure corrects itself within the 90 second delay period continous operation is maintained.

The system may also be turned on by supplying a 600 cycle tone switching signal from the oscillator control circuit 80 for modulation upon the carrier waves alternately radiated from the center station. In this case, end station 12 is turned on first and end station 11 comes on thereafter in response to action of receivers 38 and 39 in heterodyning the wave radiated from station 12 with the 1772.000 kilocyle wave radiated from center station 10.

With all the transmitting stations in operation the GREEN monitor receiver 71 at the center station reproduces the 600 cycle reference signal modulated upon the carrier wave radiated from the end station 12 and passes the same through the band pass filter 92 to operate the tone detector 74. Similarly, the RED monitor receiver 72 reproduces the 240 cycle reference signal modulated upon the carrier wave radiated from the end transmitting station 11 and passes this signal through the filter 76 to operate the tone detector 75. Since the signals produced by receivers 71 and 72 are used only for monitoring purposes and have no effect on the position indications provided at the mobile receiving unit, it is not necessary to employ standby receivers at the center station.

As illustrated in FIG. 4, the tone detectors 74 and 75 are similar to the tone detector 43 previously described. However, in view of the fact that the input circuit of each of the tone detectors 74 and 75 is excited by a single signal, a linear mixer need not be employed as the input stage. Thus, the tone detector 74 includes an amplifier circuit 180 which is excited by the 600 cycle signals from the band pass filter 92. The output signals of amplifier 180 are passed through another 600 cycle band pass filter 181 to a half-wave rectifier circuit 182 which is similar to the rectifier 109 described above. Thus, the rectifier 182 passes the negative half-cycles of the 240 cycle signal to the control grid of a D.C. amplifier 183 which is identical to the amplifier 110. The RC network in the input circuit of the D.C. amplifier 183 has a time constant which permits this circuit to hold and maintain the negative signal during the normal switching period of the system and thus as long as signals are supplied to the tone detector 74, the tone detector relay 184 remains open. The tone detector 75 is identical to the tone detector 74 except that a 240 cycle band pass filter 185 is employed in place of the filter 181 and, as a consequence, as long as the tone detector 75 is excited by a 240 cycle input signal from band pass filter 76 the tone detector relay 186 is maintained open.

The tone detector relays 184 and 186 are employed to control the operation of the condition indicator 77 which provides appropriate indications in the event of failure of one or more of the end transmitting stations. As long as the transmitting system is functioning properly, the relays 184 and 186 remain in their open position, illustrated in FIG. 4, and current from an A.C. source is supplied from terminal 192 through a manually operated reset switch 191 through signal connector 190 and through the contacts of relays 184 and 186 to one side of system-on signal light 196 and to one side of operating coil 194 of an alarm relay 195. The other sides of coil 194 and of light 196 are connected together and to terminal 188 of the source. Thus, the relay 195 is normally energized and light 196 is illuminated for normal system operation. However, in the event that the 600 cycle signal input to the tone detector 74 disappears the relay 184 will be closed to close contact 184a and complete a circuit for energizing a signal light 187. The described circuit extends from terminal 188 through a signal connector 189, through the signal light 187, through the contact 184a, through connector 190 and through the reset switch 191 to the terminal 192. Thus, the absence of 600 cycle signal input to the tone detector 74 is indicated immediately by illumination of the GREEN signal light 187.

In the event that the 240 cycle signal input to the tone detector 75 disappears, the relay 186 is closed to complete a circuit to a signal light 193. In the event that both of the tone detectors 74 and 75 lose their input signal, the circuit to the operating coil 194 of the alarm relay 195 is opened and the circuit to the system-on light 196 is also opened. The relay 195 has two sets of contacts, one set 195a of which functions, when the relay is deenergized, to lock the relay operating coil 194 across the terminals 188 and 192 and the other set 195b of which energizes an alarm bell to indicate system breakdown.

Failure at the end transmitting stations can be due to one of two causes, either a loss of modulation or a loss of the carrier wave signal. In the event that only modulation signal is lost from the end station 12 and assuming that the rest of the system remains operative, the 600 cycle signal at the output of filter 92 disappears and the tone detector relay 184 closes, but the tone detector relay 186 remains open. Under these conditions the GREEN indicating light 187 comes on, but the circuit to the operating coil 194 is not broken, since this circuit is still completed through the closed contacts of the relay 186. Therefore, the alarm bell does not sound. If, on the other hand, the end station 12 loses its carrier wave signal, this action will soon be followed by a loss in beat signal output at the receivers 38 and 39 and, consequently, the end station 11 will go off the air at the end of the "delay off" period. Under these conditions signal output from both of the filters 76 and 92 disappears and both of the relays 184 and 186 are closed to break the circuit to relay coil 194 and, hence, to sound the alarm bell.

Similarly, if the end station 11 should lose only modulation, signal disappears from the output of filter 76 and the RED signal light 193 becomes illuminated but the alarm bell does not sound. Loss of carrier wave signal output at the end station 11 is, of course, accompanied by a shutdown at the end transmitting station 12 to operate the alarm bell of the condition indicator 77. Thus, if one of the lights 187 or 193 is illuminated without sounding the alarm the operator is informed that the station identified by the particular light illuminated has lost its modulation. If the alarm bell rings the operator at the center station can surmise that one of the end stations has lost its carrier and he may determine the cause of the failure by interrogating the end stations. Interrogation of the end station 11 is performed as described above by rendering the center station effective by closing switch 96 to radiate its 1772.000 kilocycle signal and the 240 cycle signal output from the amplifier control circuit 80 is modulated upon the wave. If the end station 11 is functioning properly, it will come on the air and its operation will be indicated by the signal monitor circuit 90 in the manner previously described. The interrogation of the end station 12 may, of course, be effected by closing switch 97 to cause the center station to radiate its 1798.000 kilocycle signal and by modulating this signal with the 600 cycle tone switching signal from the oscillator control circuit 80. In this manner the source of the trouble can be determined and the necessary steps can be taken to correct it. The alarm bell of the condition indicator remains energized even though the standby transmitter at the station which failed is rendered operative and the bell remains energized until the reset switch 191 is opened to break the circuit to the relay 195.

As indicated above, the automatic transfer between the transmitters 14 and 15 at the center station 10 is effected by the transfer unit 16 in cooperation with the antenna changeover unit 23. The antenna changeover unit 23 is generally similar to the unit 33 illustrated in FIG. 2 and described above and includes means for applying a sample RF signal to an RF detector circuit 198 (FIG. 5) in the unit 16 as, for example, through a signal connector 199. This RF signal is applied through a radio frequency filter 200 which may be tuned either to the 1772.000 kilocycle frequency or to the 1798.000 kilocycle frequency. The selected frequency is passed through a half-wave rectifier circuit 201 having a long time constant RC filter therein which rectifies the input signal and supplies negative half-cycles to the control grid of a D.C. amplifier 202. The long time constant RC filter, which may be either at the output of the rectifier 201 or at the input of the D.C. amplifier 202, maintains the negative signal for a period in excess of the switching period by closing switch 96 to radiate its 1772.000 kilocycle signal and the 240 cycle signal output from the amplifier control circuit 80 is modulated upon the wave. If the end station 11 is functioning properly, it will come on the air and its operation will be indicated by the signal monitor circuit 90 in the manner previously described. The interrogation of the end station 12 may, of course, be effected by closing switch 97 to cause the center station to radiate its 1798.000 kilocycle signal and by modulating this signal with the 600 cycle tone switching signal from the oscillator control circuit 80. In this manner the source of the trouble can be determined and the necessary steps can be taken to correct it. The alarm bell of the condition indicator remains energized even though the standby transmitter at the station which failed is rendered operative and the bell remains energized until the reset switch 191 is opened to break the circuit to the relay 195.

As indicated above, the automatic transfer between the transmitters 14 and 15 at the center station 10 is effected by the transfer unit and hiatus reducer 16 in cooperating with the antenna changeover unit 23. The antenna changeover unit 23 is generally similar to the unit 33 illustrated in FIG. 2 and described above and includes means for applying a sample RF signal to an RF detector circuit 198 (FIG. 5) in the unit 16 as, for example, through a signal connector 199. This RF signal is applied through a radio frequency filter 200 which may be tuned either to the 1772.000 kilocycle frequency or to the 1798.000 kilocycle frequency. The selected frequency is passed through a half-wave rectifier circuit 201 having a long time constant RC filter therein which rectifies the input signal and supplies negative half-cycles to the control grid of a D.C. amplifier 202. The long time constant RC filter, which may be either at the output of the rectifier 201 or at the input of the D.C. amplifier 202, maintains the negative signal for a period in excess of the switching period of the center transmitting station and, as a result, a substantially continuous negative signal is supplied to the amplifier 202 as long as the center station 10 is radiating its radio frequency signals. The negative signal supplied to the amplifier 202, of course, cuts off the plate circuit flow of this amplifier and opens the hiatus reducer relay 203. In the event of failure of the output signal supplied from the antenna changeover unit 23, the negative voltage supplied to the control grid of the D.C. amplifier 202 is removed and this amplifier starts to pass plate current through the operating coil 204 of the relay 203, thereby to close the relay 203 and apply the voltage from a suitable alternating current source such as a 110 volt supply to a time delay relay 205. The latter relay is indicated as being of the thermal type and at the end of the predetermined time delay period the relay 205 closes its contacts and completes a circuit to energize the operating coil 206 of a ratchet transfer relay 207. The ratchet relay 207 is similar to the relay 122 described above in that energization of the operating coil 206 actuates an operating pawl 208 to advance the ratchet relay one step. Movement of the ratchet of the relay 207 drives a shaft 209 to rotate switch operating cams 210 and 211 which function to alternately open and close switches 212 and 213 in an obvious manner. When switch 212 is closed, switch 213 is open, and supply voltage is delivered through the operating coil of an antenna changeover relay 214 to the transmitter 14. The antenna changeover relay when energized connects the output of the final amplifier of the transmitter 14 to the antenna circuit 24 and, when deenergized, connects the output of transmitter 15 to the antenna circuit 24. When the ratchet relay 207 is so positioned that the switch 212 is opened, the switch 213 is closed and power is supplied through connector 215 to the transmitter unit 15. Under the latter conditions the antenna changeover relay 214 is deenergized and the final amplifier of the transmitter 15 is connected to the antenna circuit 24. A manually operated switch 216 may be employed to bypass the ratchet relay 207 in order to place either the transmitter 14 or the transmitter 15 in operation for purposes of testing or calibration. Thus, when the switch 216 is in the upper position illustrated in FIG. 5, power supply to the transmitter 14 is delivered through the antenna changeover relay and through the closed contacts of section 216a of switch 216. No power, of course, flows to the transmitter 15 in view of the open circuit at switch section 216b. When the switch 216 is moved to its lower position, section 216b of the switch 216 functions to supply plate voltage to the electron discharge tubes of the transmitter 15 and section 216a interrupts the circuit to transmitter 14. The antenna changeover relay 214 is obviously controlled by the actuation of the switch 216 to effect the connection of the proper transmitter to the antenna circuit 24. In view of the foregoing description, it will be recognized that in the event that the signal input to the unit 16 fails, the relay 203 is closed to operate the time delay relay and after the predetermined delay period has expired the ratchet relay 207 is advanced to automatically transfer the operation to the standby transmitter. The delay period effected by the relay 205 is again provided in order to prevent momentary failures from shutting down the equipment, thereby permitting these momentary failures to correct themselves without interfering with the operation of the system.

Turning now to the equipment comprising the failure indicator 70 which, as previously indicated, may be located either at the network office or at any point remote from the transmitting stations 10, 11 and 12, this equipment comprises a pair of receivers 220 and 221, respectively tuned to frequencies of 1772.120 and 1798.300 kilocycles. These receivers are excited by a common loop receiving antenna 222 which is so oriented that it accepts the signals radiated from all three of the stations 10, 11 and 12. The GREEN receiver 220 is, of course, sufficiently selective to reject the signal radiated from the end station 11 and the 1798.000 kilocycle signal alternately radiated from the center station 10, while the RED receiver 221 is sufficiently selective to reject the signal continuously radiated from the end station 12 and the 1772.000 kilocycle signal alternately radiated from the center station 10. The receiver 220 heterodynes the signal from the end station 12 with the 1772.000 kilocycle signal alternately radiated from the center station 10 to develop a 240 cycle beat frequency which is passed through a band pass filter 223 to a GREEN heterodyne tone detector 224. The GREEN receiver 220 also reproduces the 600 cycle reference signal alternately modulated upon the carrier wave continuously radiated from the end station 12 and passes this 600 cycle signal through a band pass filter 225 to a RED modulation tone detector 226. The filter 225 is, of course, sufficiently selective to reject the 240 cycle beat frequency signal developed by the receiver 220 and, correspondingly, the filter 223 rejects the 600 cycle reference signal reproduced by the receiver 220. The RED receiver 221 heterodynes the signal continuously radiated from the end station 11 with the 1798.000 kilocycle signal alternately radiated from the center station 10 to develop a 600 cycle beat frequency signal which is passed through filter 227 to a RED heterodyne tone detector circuit 228. The RED receiver 221 also reproduces the 240 cycle reference signal alternately modulated upon the carrier wave continuously radiated from the end station 11 and applies this signal through a 240 cycle band pass filter 229 to a GREEN modulation tone detector 230. The filter 229, of course, rejects the 600 cycle heterodyne signal developed by the receiver 221 and the filter 227 rejects the 240 cycle reference signal reproduced by the receiver 221.

The tone detectors 224, 226, 228 and 230 are similar to the tone detectors 74 and 75 illustrated in FIG. 4 and each functions to hold open a tone detector relay as long as it is excited by input signals of the proper frequency. Of course, each of these tone detectors contains an audio frequency circuit tuned to the appropriate frequency to prevent its operation by intermittent or spurious signals. The tone detector relay associated with the tone detector 224 is indicated at 224a, the tone detector relay associated with the tone detector 226 is indicated at 226a, and so forth.

There are four conditions which can exist at the end stations to cause operation of the system to break down, and these four conditions may be analyzed and identified by reference to the four signals supplied to the four tone detector circuits of the failure indicator 70. Failure indications respectively representative of the four conditions are provided by employing the tone detector relay to energize a relay matrix indicated generally at 231 in the manner described below. When the system is operating properly all four of the described tones are supplied to the tone detectors and all of the relays are open. End station failure can occur in any one of the following four ways:

*Condition 1.*—The GREEN station carrier fails, in which event the GREEN heterodyne signal disappears from the output of the filter 223, the GREEN reference signal is no longer developed by the receivers 38 and 39 at the end station 11 and, accordingly, the GREEN reference signal does not appear at the output of the filter 229. The RED reference signal no longer appears at the output of the filter 225, since the carrier wave for this signal is no longer available. At the end station 11, development of the 240 cycle beat signal by the receivers 38 and 39 terminates, but the RED station carrier remains on the air for 90 seconds before the "delay off" relay is operated. During this 90 second period, the RED heterodyne signal is developed at the output of the band pass filter 227 and the tone detector 228 maintains its relay open while, as indicated above, the relays associated with the other three tone detectors 224, 226 and 230 are all closed.

*Condition 2.*—The GREEN station modulation fails, in which case the RED reference signal appearing at the output of the band pass filter 225 disappears. Since all carriers are still present, both the GREEN and RED heterodyne signals and the GREEN reference signal are available and are passed to their associated tone detector circuits. Under these conditions the relay associated with the tone detector 226 is closed, while the relays associated with the other three detectors remain in their open position.

*Condition 3.*—The RED station carrier fails, in which event the GREEN heterodyne signal is present for 90 seconds following the failure, while the RED heterodyne signal, the reference signal and the GREEN reference signal all disappear. Thus, under these conditions the relay associated with the tone detector 224 is open, while the relays associated with the other three tone detectors are closed.

*Condition 4.*—The RED station modulation fails, in which case the GREEN reference signal disappears from the output of the band pass filter 229. The GREEN heterodyne signal, the GREEN reference signal and the RED reference signal are all present. Under these conditions the relay 230a associated with the tone detector 230 closes, while the relays associated with the other three tone detectors remain open.

As previously indicated, it is the function of the relay matrix 231 to respond to these on-off conditions of the relays by indicating which of the four enumerated conditions is present in the event of end station failure. The indications are provided in the form of signal lights 232, 233, 234 and 235, which respectively indicate the presence of conditions 1, 2, 3 and 4 enumerated above. The relay matrix 231 is excited from a 110 volt supply appearing between line conductors 236 and 237. The presence of excitation voltage between these two conductors is indicated by a power-on light 238. The excitation voltage for the D.C. power supply and for the other circuits of the failure indicator 70 is derived through an on-off switch 239 and through a signal connector 240. Line conductor 237 is connected through a manually operated reset switch 241 to one side of each of the signal lights 232, 233, 234 and 235, and to one side of a system-on light 242 which has its other side connected through the normally closed contacts of a suitable time delay relay 243 to the other line conductor 236. Thus, the system-on light 242 provides an indication that the contacts of relay 243 are closed and that the relay matrix 231 is conditioned for operation.

The line conductor 237 is also connected to the movable arm or pole of each of the tone detector relays 224a, 226a, 228a and 230a. The normally open contacts of the latter relays are respectively connected to one side of the operating coils of relays 250, 251, 252 and 253 in the matrix 231. The other sides of these relays are connected together to the movable arm of the time delay relay 243 and through the normally closed contact 243b of this relay to the line conductor 236. Thus, as soon as one of the tone detector relays is closed by the absence of signal at the input circuit of its associated tone detector, a circuit is completed for energizing the associated matrix relay. Specifically, under condition 1 described above, relays 250, 251 and 252 are simultaneously energized to close their contacts. Closing of contacts 250a and 251a connects the line conductor 236 through connector 254 to the signal light 232 in order to indicate that the GREEN station carrier wave has failed. Connector 254 also functions to connect the line conductor 236 through conductor 255 to parallel connected operating coils of relays 256 and 257 in the matrix, the other end of both of these relays being connected directly to line conductor 237. Operation of relay 257 opens its contacts and prevents the light 235 from being turned on. Light 234 cannot be turned on because it is confronted by an open circuit at contact 253a of relay 253, while light 233 is not illuminated because it is confronted by an open circuit at contact 251b of relay 251.

Energization of the relay 256 breaks the normally closed contact 256b and, hence, interrupts an energizing circuit for the operating coil of an alarm relay 261. This energizing circuit extends from line conductor 236 through normally closed contact 256b, through normally closed contact 258b, through normally closed contact 259b and through normally closed contact 260b. De-energization of the operating coil of the relay 261 causes the movable arms of this relay to occupy the position illustrated in FIG. 6 so that contact 261a is closed to complete a circuit to an alarm not shown. The alarm, of course, apprises the operator at the failure indicator station that normal operating conditions no longer prevail. Closing of contact 261b of relay 261 connects the line conductor 237 across the operating element 243a of the time delay relay 243. If the cause of the operational failure of the GREEN carrier does not remedy itself within the delay period of the relay 243, this relay becomes energized to break contact 243b and, hence, to remove operating potential from the relays 250, 251, 252 and 253. If, on the other hand, the cause of the failure is remedied before the cycle of relay 243 has been completed, the tone detector relays all revert to their open conditions and the relay 261 is again energized to break the circuit to time delay relay 243 and to shut off the alarm. The time delay provided by relay 243 is less than that provided by the transfer delay relay 140 employed at the end stations.

Operation of the relay 256 has another important result, in that it closes contact 256a and completes a circuit to the operating coil of relay 256 from conductor 254 through connector 255 in order to lock this operating coil across the voltage supply line. Cessation of current flow in the relays 250, 251, 252 and 253 insures that further events taking place at the tone detectors have no effect, due to the fact that the contacts of the time delay relay 243 are open when the relay 261 is deenergized. Thus, even though the standby transmitter at the end station which failed is subsequently rendered effective, this can have no effect on the failure indicator 70. Specifically, the contacts of the time delay relay 243 are maintained in their open position, due to the fact that the operating element 243a is locked directly across the line conductors 236 and 237. The failure indicator also functions to maintain the signal light 232 illuminated in view of the fact that the coil of relay 256 is locked across the line and the now closed contact 256a is effective to complete the circuit from line conductor 236 through conductor 254 to the light 232. Thus, even though the operator may be temporarily absent when the failure occurs, the failure indicator maintains its indications to inform him that repairs must be made at the identified end station.

To reset the unit for operation after the failure has been corrected, either by way of corrective repairs or otherwise, it is necessary merely to open the manually operable reset switch 241 which breaks the circuit to all of the signal lights and, at the same time, interrupts the circuit to the operating element 243a of the time delay relay 243. Operation of the reset switch also breaks the energizing circuit for the relays 256 and 257 and allows the contacts of these relays to return to the position illustrated in FIG. 6. Thus, when the reset switch 241 is again closed, all of the circuit elements of the failure indicator 70 again occupy the positions illustrated in FIG. 6.

If the second condition prevails, relay 252 is energized to complete a circuit from line conductor 236 through its closed contact 252b, through the normally closed contact 251b, through signal connector 262 and through the normally closed contact 263a of relay 263 to the GREEN modulation signal light 233. Signal light 232 remains off, since it is confronted by an open circuit at contact 250a, signal light 235 remains off because its energizing circuit is open at contact 250b and signal light 234 remains off because it is confronted by an open circuit at contact 253a. The energized conductor 262 is connected to one end of the operating coil of relay 258 so that the latter relay is actuated to open its contacts in order to lock the operating coil across the line by closing of contacts 258a and to interrupt the energizing circuit for the operating coil of relay 261 by breaking contact 258b. Deenergization of the operating coil of relay 261, of course, actuates the alarm circuit and, at the same time, applies an operating voltage across the operating element 243a of the time delay relay 243 with the results described above.

Under condition 3 described above, relays 250, 252 and 253 are all actuated, while relay 251 remains in its deenergized state. Energization of the three identified relays completes a circuit from the line conductor 236 through the now closed contact 253a, through the now closed contact 252a and through signal connector 265 to illuminate the RED carrier signal light 234. The energized conductor 265 applies operating voltage across the operating coils of relays 259 and 263. Actuation of the relay 263 opens its contact 263a and prevents the signal light 233 from being illuminated. The energizing circuit for signal light 235 is open at contact 253b and, hence, light 235 remains off. The circuit to signal light 232 is open at contact 251a and, as a result, this light does not become illuminated. Operation of the relay 259 breaks the contact 259b to interrupt the circuit to the alarm relay 261 and, at the same time, closes contact 259a to lock the operating coil 259 across the line, with the results described above.

Under the fourth condition, the relay 250 is energized, while the relays 251, 252 and 253 remain in their deenergized conditions. When relay 250 is actuated, a circuit is completed from line conductor 236 through normally closed contact 253b, through the now closed contact 250b, through conductor 270, through the closed contacts of relay 257 and through conductor 271 to the signal light 235. The light 235 is thus illuminated to indicate that the RED station modulation has failed. The signal light 232 is not illuminated, in view of the fact that its energizing circuit is opened at contact 251a while the circuit for light 234 is open at contact 252a and the energizing circuit for light 233 is open at contact 252b.

Application of energizing potential to the conductor 270 causes an operating current to be passed through the coil of relay 260 in order to actuate the contacts of the latter relay. Opening of contact 260b, of course, breaks the energizing circuit for the relay 261 with the results described above while closing of contact 260a locks the coil of relay 260 across the line, in view of the fact that the contact 260a is connected directly to the line conductor 236.

In view of the foregoing description, it will be recognized that the failure indicator 70 functions to provide an immediate indication of operating failure occurring at either of the end stations 11 or 12. The lock-on feature of the relay matrix 231 maintains the indication until the trouble has been corrected and until the reset switch 241 is opened manually.

In view of the detailed description above, it will be recognized that the system illustrated in FIGS. 1 through 6 may be turned on or off from the center transmitting station 10 and, accordingly, the present invention avoids the use of a continuous station watch at the end transmitting stations 11 and 12. Moreover, all three of the transmitting stations include standby transmitting equipment which is automatically rendered operative in the event of failure of the main transmitting equipment. Furthermore, the system includes means at the center station and at the failure indicator 70 for monitoring the system in such fashion that operational failure is immediately indicated and also for identifying and locating the source of the trouble.

The invention may also be employed in a transmitting system of the type disclosed and claimed in U.S. Patent No. 2,513,316 to James E. Hawkins, assigned to the same assignee as the present invention. Such a system is illustrated in FIGS. 7 and 8, wherein there is shown a center transmitting station 310 and a pair of spaced apart end transmitting stations 311 and 312, which are adapted to radiate signals of different frequency separated from each other by a small audio frequency difference. The end stations 311 and 312 are preferably located approximately equal distances from the center station 310 and are so disposed that an imaginary base line extending between the center station 310 and the end station 311 is angularly related to a similar base line extending between the center station 310 and the end station 312. The transmitting system also includes a reference station 313 located at some distance from the three transmitting stations 310, 311 and 312 and effective to transmit reference signals in the form of modulation signals developed from heterodyning waves received from the stations 310, 311 and 312.

Equipment is employed for turning on and off three of the stations 310, 311 and 312, under the control of modulated signals radiated from the reference station 313. In addition, each of the four transmitting stations includes standby transmitting equipment which is automatically rendered effective in the event of failure of the main transmitting facilities.

Furthermore, monitoring equipment is provided at the reference station 313 for indicating failure of one of the transmitting stations and for identifying the station at which the failure occurred. This indication is maintained even after the standby transmitting equipment has been rendered operative, so that the necessary repairs can be made without requiring the system to be shut down.

The equipment provided at the center station 310 to effect the above enumerated results comprises a first transmitter 314 and a second transmitter 315, only one of which is adapted to be rendered operative at a time, so that the inoperative transmitter serves as a standby unit. Each of these transmitters includes an oscillator or signal generator, a final amplifier and one or more intermediate amplifiers and each is adapted to develop a signal having a frequency of 1798.240 kilocycles. The output signal from the final amplifier of both of the transmitters 314 and 315 is supplied through an antenna changeover unit 323 to an emitting antenna circuit 324. The antenna changeover unit 323 is identical to similar units described above and functions automatically to connect the antenna circuit 324 to the output of the proper transmitter 314 or 315 in the manner previously described. The antenna changeover unit 323 also supplies a sample of the RF output signal supplied to the antenna circuit 324 through a signal connector 325 to a transfer unit and RF detector 316. The latter unit is similar to the transfer unit illustrated in FIG. 2 and employed at the end station of the transmitting system illustrated in FIG. 1. However, the transfer unit 316 includes an RF detector like the detector 198 illustrated in FIG. 5 in place of the modulation detector 138. This RF detector, of course, functions to control the operation of a relay to maintain the relay open as long as an RF signal is being supplied to the antenna 324 and to close the relay in the event of signal failure. This relay corresponds to the relay 137 of the transfer unit shown in FIG. 2. In all other respects the transfer unit 316 is identical to the unit 32 described in detail above.

The remote control at center station 310 is effected through control of the transfer unit 316 by means of a tone detector 317 which is identical to the tone detector 74 illustrated in FIG. 4. The tone detector 317 is excited by the signals developed by a continuously operated receiver 318 tuned to a frequency of 1772.000 kilocycles and sufficiently selective to reject signals from the end stations 311 and 312. The signal input terminals of the receiver 318 are excited by the signals picked up by a loop receiving antenna 320 which is so oriented that the signals emitted from the emitting antenna 324 are nulled, while the signals radiated from the reference station 313 are accepted. The signals developed by the receiver 318 are passed through filters 321, 322 and 326 respectively tuned to frequencies of 240 cycles, 360 cycles and 600 cycles to a non-linear mixer circuit 327. The output signals of the latter mixer circuit are passed through a band pass filter 328 tuned to a frequency of 600 cycles to the tone detector 317. Standby or alternate receiving equipment may, of course, be employed if desired, but this is not illustrated in the drawings.

The equipment provided at the end station 311 comprises a pair of transmitters 330 and 331, each developing a signal having a frequency of 1798.000 kilocycles. Only one of these transmitters is employed at a time, the other unit serving as a standby transmitter in case of operational failure of the main transmitting equipment. Each transmitter includes an oscillator or signal generator and one or more amplifying stages, the final amplifying stage of each transmitting unit being connected to deliver its output signals through an antenna changeover unit 333 to an antenna circuit 334. The antenna changeover unit 333 is like the unit 33 employed at the end station 11 in the system illustrated in FIG. 1 and includes means for automatically applying the output of the proper transmitter 330 or 331 to the antenna circuit 334. Transmitters 330 and 331 are rendered effective automatically by means of a transfer unit and RF detector 332 which is excited by a sample signal supplied from the antenna changeover unit 333 via a signal connector 335. The unit 332 is identical to the unit 316 employed at the end station and is controlled by a tone detector 336 which corresponds to the detector 317 at the center station. The tone detector 336 is excited by the signals developed by a receiver 338 and passed through a 240 cycle band pass filter 339. The input terminals of the receiver 338 are excited by the signals picked up by a loop receiving antenna 340 which is so oriented that a maximum response is provided for signals arriving from the reference station 313, while the high power signals emitted from the antenna 334 are effectively nulled or eliminated. The receiver 338 is centered tuned to a frequency of 1772.000 kilocycles and, hence, is adapted to reject the signals radiated from both of the stations 310 and 312, while accepting the signals radiated from the reference station 313.

The equipment provided at the end station 312 comprises a pair of transmitters 350 and 351 for developing signals having a frequency of 1798.600 kilocycles, which are passed through an antenna changeover unit 353 to a radiating antenna circuit 354. Only one of the transmitters 350 or 351 is effective at any particular time, the remaining unit being a standby transmitter which is rendered operative automatically in the event of failure of the effective transmitter under the control of a transfer unit and RF detector 352. The transfer unit 352 is identical to the unit 316 employed at the center station and is excited by RF signals passed from the antenna changeover unit 353 through a signal connector 355 to the RF detector portion of the unit 352. Remote control of the end station 312 is effected by controlling the operation of the transfer unit 352 through a tone detector 356 similar to the tone detector 317 referred to above. The tone detector 356 receives excitation from the output signals of a receiver 358, which signals are passed through a band pass filter 359 tuned to a frequency of 360 cycles. The signal input terminals of the receiver 358 are excited by the signals picked up by a loop receiving antenna 360 which is so oriented that the signals emitted from the antenna 354 are nulled or eliminated. The receiver 358 is center tuned to a frequency of 1772.000 kilocycles and its input stages are sufficiently selective to reject the signals arriving at the antenna 360 from the center station 310 and from the end station 311, while passing the signals arriving from the reference station 313.

Turning now to the equipment provided at the reference station, this equipment includes a pair of transmitters or signal generators 370 and 371, each of which includes an oscillator developing signals having a frequency of 1772.000 kilocycles, an amplitude modulation circuit and a final amplifier stage. These transmitters are, of course, rendered operative one at a time and the inoperative transmitter functions as a standby unit. The final amplifier stage of the operative transmitter is automatically connected to an antenna circuit 373 by means of an antenna changeover unit 372 like the unit 323 described above. Automatic transfer to the standby transmitter in the event of failure of the operative transmitter is effected by a transfer unit and modulation detector 374. The unit 374 is similar to the transfer unit illustrated in FIG. 5, but it includes a modulation detector circuit like the circuit 138 shown in FIG. 2 in place of the RF detector circuit 198. The modulation detector circuit is excited by signals supplied from the antenna changeover unit 372 and, in the absence of such signals, the detector relay at the output of the modulation detector circuit functions to effect the automatic transfer to the standby transmitter in the manner previously described.

To provide reference signals for phase comparison at the mobile receiving unit with heterodyne signals derived from waves radiated from stations 310, 311 and 312 in conventional manner, the reference station 313 includes a reference receiver 375 which is center tuned to a frequency of 1798.300 kilocycles and which accepts the signals radiated from all of the stations 310, 311 and 312. To this end, the signal input terminals of the receiver 375 are excited by signals picked up by a loop receiving antenna which is so positioned that the signals radiated from the antenna 373 are nulled. The receiver 375 functions to heterodyne the three accepted signals and develops the beat frequencies therebetween. The 240 cycle beat frequency signal developed as a result of heterodyning the wave received from the end station 311 with the wave received from the center station 310 is passed through a 240 cycle band pass filter 377 to the modulation circuits of both of the transmitters 370 and 371. Similarly, the 360 cycle beat frequency signal developed as a result of heterodyning the signal radiated by the center station 310 with that radiated by the end station 312 is passed through a 360 cycle band pass filter 378 to the modulator circuits of the transmitters 370 and 371. The filters 377 and 378 both reject the 600 cycle beat frequency signal developed as a result of heterodyning the two waves received from the end stations 311 and 312 and, as a result, the 600 cycle signal is not modulated upon the 1772.000 kilocycle wave continuously radiated from the reference station 313, thereby to conserve both the side band power and the amount of frequency spectrum required for complete system operation.

All three of the beat frequency signals developed by the receiver 375 are also applied to a failure indicator circuit 380 which is illustrated in FIG. 8 and which is somewhat similar in operation to the failure indicator 70 previously described. The failure indicator 380 responds to the three input signals to provide indications which inform the reference station operator that a failure has occurred and also identifies the location of the failure. The signal output of the reference receiver 375 may also be applied to one set of signal input terminals of a system monitor circuit 381, the other set of signal input terminals of which is excited by the output of an oscillator control circuit indicated generally at 382. The oscillator control circuit includes three audio frequency oscillators 383, 384 and 385, respectively developing tone switching signals having frequencies of 240, 360 and 600 cycles and an oscillator selector switch 386 for selectively applying the outputs of one or more of the oscillators to an amplifier circuit 387 through which the signals are passed to the system monitor 381. The output of the amplifier 387 is also applied through a modulation on-off switch 388 to the modulator circuits of the transmitters 370 and 371. The oscillators 383, 384 and 385 are similar to the oscillators 81 and 82 illustrated in FIG. 3 and the amplifier 387 is identical to the amplifier 84 described above.

The oscillator selector switch 386 is illustrated in its off position wherein no signals are supplied to the amplifier 387. The operator at the reference station 313 may turn either of the stations 310, 311 and 312 on or off by the selective application of the output of the oscillators 383, 384 and 385 to the modulator circuits of the transmitters 370 and 371. Moreover, all three of the stations 310, 311 and 312 may be turned on simultaneously to place the entire system in operation.

In the event that it is desired to turn on only the end station 311, the operator at the reference station 313 first places one of the transmitters 370 or 371 in operation by means of a manually operated on-off switch not illustrated, he closes the modulation on-off switch 388 and he then places the oscillator selector switch 386 in position No. 2 illustrated in FIG. 7 in which case the 240 cycle signal developed by the oscillator 383 is passed through the amplifier 387 to the modulator circuits of the transmitters 370 and 371. Thus, the reference station 313 is rendered effective continuously to radiate a 1772.000 kilocycle carrier wave amplitude modulated with a 240 cycle tone switching signal. This signal is accepted by the receiver 358 at the end station 12 but the reproduced 240 cycle modulation component is rejected by the audio filter 359 and, hence, has no effect on the operation of this particular end station. The modulated wave radiated from the reference station is also accepted by the receiver 318 at the center station 310 and the reproduced 240 cycle signal is passed through filter 321 to the mixer 327, but this 240 cycle signal is rejected by the filter 328 and, as a consequence, does not affect the operation of the center station. The modulated carrier wave emitted from the reference station is also accepted by the receiver 338 at the end station 311 and the reproduced 240 cycle modulation component is passed through audio filter 339 to induce the tone detector circuit 336 to open its tone detector relay, thereby initiating the turn-on procedure described above. As previously described, the first operation that takes place in the unit 332 is a transfer from one of the transmitters 330 or 331 to the other transmitter, thus insuring that these stations will be alternated each time the end station 311 is turned on in order to extend the operating life of the transmitting facilities. At the end of a predetermined "delay on" period, the transfer unit 332 renders one of the transmitters effective so that a 1798.000 kilocycle signal is continuously radiated from the end station antenna 334. If it is desired to monitor the end station 311 and the center station 310, the center station must first be turned on by placing the selector switch 386 at the reference station 313 in position No. 4. The "delay off" relay at the end station 311 will prevent the end station signal from going off the air for the predetermined "delay off" period. When the selector switch is moved to position No. 4, the reference station 313 is rendered effective to radiate its 1772.000 kilocycle carrier wave amplitude modulated with the 600 cycle tone switching signal. This tone switching signal has no effect on the operation at the end stations 311 and 312, due to the action of the audio filters 339 and 359. However, the 600 cycle switching signal is reproduced by the receiver 318 at the center station 310 and is passed through filter 326, through mixer 327 and through filter 328 to operate the tone detector 317 at the center station so that the latter opens the tone detector relay initiates operation of the transfer unit 316. Again, the unit 316 causes an initial transfer from one of the transmitters 314 or 315 to the other transmitter and thereafter to render the effective transmitter operative to radiate a 1798.240 kilocycle signal from the antenna 324. The signal radiated from the antenna 324 is heterodyned at the reference receiver 375 with the signal radiated from the end station 11 and the reproduced 240 cycle signal is passed to the signal monitor equipment 381 which may be used to compare the 240 cycle heterodyne signal developed with the output of the oscillator 383 by placing the oscillator selector switch 386 in position No. 2, in which case the 240 cycle signal output of the oscillator is supplied through the amplifier 387 to the signal monitor circuit 381. The signal monitor circuit is similar to the circuit 90 illustrated in FIG. 3 and may be used to provide an oscilloscope type presentation which compares the heterodyne signal from the reference receiver 375 with the standard, highly stable frequency developed by the oscillator 383. The pattern appearing upon the screen of the oscilloscope may, of course, be used to determine whether the system is operating properly. In addition, the output of the receiver 375 may be applied to a loudspeaker or the like in order to listen to the heterodyne signal developed to make certain that the transmitters at the stations 310 and 311 are operating.

If it is desired to monitor the end station 312 and the center sation 310, the oscillator selector switch 386 may be moved to position No. 3, in which case the reference station will be rendered effective to radiate its 1772.000 kilocycle carrier wave amplitude modulated with a 360 cycle tone switching signal supplied by the oscillator 384. The 360 cycle tone switching signal has no effect on the operation of the center station 310 or the end station 311, due to the action of the filters 328 and 339. The 360 cycle switching cycle is reproduced by the receiver 358 at the end station 312 and is passed through filter 359 to induce the tone detector 356 to open the tone detector relay and initiate operation of the transfer unit 352. The unit 352, of course, first transfers the operation from one of the transmitters 350 or 351 to the other transmitter and at the end of the "delay on" period renders the effective transmitter operative to radiate a 1798.600 kilocycle signal from the antenna 354. The center station 310 may be turned on as described above, by applying a 600 cycle tone switching signal to the modulator circuits of transmitters 370 and 371. If the monitoring is performed prior to the expiration of the "delay off" period at the center station, the latter will already be in operation and need not be turned on. In any event, the signal radiated from station 312 is heterodyned at the receiver 375 with the signal radiated from the center station 310 to develop a 360 cycle signal which may be monitored by the system monitor circuit 381 in the manner indicated above.

In order to render all three of the transmitters 310, 311 and 312 operative simultaneously to place the system in operation, the oscillator selector switch 386 is thrown into position No. 5, thereby applying the output of both of the oscillators 383 and 384 through the amplifier 387 to the modulator circuits of the transmitters 370 and 371. Thus, the reference station 313 is rendered effective to radiate its carrier wave which is simultaneously modulated with both 240 and 360 cycle tone switching signals. The 240 cycle signal, of course, turns on the end station 311 in the manner described above, while the 360 cycle signal turns on the end station 312. Both of these tone switching signals are reproduced by the receiver 318 and are passed through filters 321 and 322 to the non-linear mixer circuit 327. The latter circuit beats the two incoming signals and develops sum and difference frequencies which are applied to the filter 328 so that the 600 cycle sum frequency is passed to the tone detector 317 in order to open the tone detector relay, thereby to place the transmitter at the center station 310 in operation at the end of the "delay on" period. In this manner all three of the stations 310, 311 and 312 are rendered operative and the oscillator selector switch 386 may be returned to its off position.

If one of the stations fails to turn on in response to the tone switching signal, the modulation on-off switch 388 may be opened for ten seconds and then closed. Such operation causes the end station to transfer to the standby equipment in the manner previously described.

With all three of the transmitting stations 310, 311 and 312 on, the reference receiver 375 heterodynes the three waves and develops 240 and 360 cycle signals which are passed through filters 377 and 378 and are amplitude modulated as reference signals upon the carrier wave created by the transmitters 370 and 371. These reference signals are, of course, reproduced by the receivers 318, 338 and 358 at the three stations 310, 311 and 312, respectively. The 240 cycle reference signal reproduced by the receiver 338 is employed to energize the tone detector 336 and maintain the end station 311 on the air. The 360 cycle reference signal reproduced by the receiver 358 is employed to operate the tone detector 356 and maintain the end station 312 in operation. Both of the reference signals reproduced by the receiver 318 are applied to the mixer 327 to produce a 600 cycle beat signal which operates the tone detector 317 and maintains the center station 310 in operation.

With all of the stations operating in the manner just described, the signals are received at a mobile receiving station of the type illustrated in the above-identified Hawkins Patent No. 2,513,316 where these received signals are converted or translated into position indications. Thus, the signal radiated from the end station 311, the signal radiated from the center station 310 and the 240 cycle reference signal appearing upon the carrier wave radiated from the reference station 313 are employed to produce a first position indication representative of the location of the mobile receiver unit relative to hyperbolic isophase lines having foci at the center station 310 and at the end station 311. In similar manner the signal radiated from the center station 310, the signal radiated from the end station 312 and the 360 cycle signal modulated upon the carrier wave radiated from the reference station 313 are employed to produce a second position indication representative of the location of the mobile receiver unit relative to isophase lines having foci at the center station 310 and at the end station 312. The two described position indications, of course, cooperate to identify a pair of hyperbolic lines intersecting at the location of the mobile receiving unit and these indications may be referred to a chart of the area in order to determine the geographical location of the mobile unit in a manner which is well known to those skilled in this art.

To turn off the transmitting stations 310, 311 and 312, it is merely necessary to terminate operation of the transmitters 370 and 371 at the reference station 313 by opening the power on-off switch. With the reference station 313 off the air, the receiver 338 no longer receives the 240 cycle reference signal, and as a result operation of the end station 311 is terminated at the end of the "delay off" period provided by the transfer unit 332. Similarly, the end station 312 is turned off at the end of the "delay off" period provided by the transfer unit 352 and operation of the center station 310 is terminated at the end of the "delay off" period effected by the unit 316. Thus, all four of the units are rendered inoperative.

As indicated above, when all four of the described transmitting stations are in operation, the failure indicator 380 may be employed to monitor the system operation and to identify the location of any failure. This failure indicator, as illustrated in FIG. 8 comprises three band pass filters 392, 393 and 394 tuned to frequencies of 240, 360 and 600 cycles, respectively. Each of these filters is excited by one of the signals appearing at the output of the reference receiver 375 and the signal from each filter is passed to a tone detector for the purpose of controlling the operation of a tone detector relay. Thus, the 240 cycle signal developed by the receiver 375 as a result of heterodyning the waves received from the stations 310 and 311 is passed through the filter 392 to operate a tone detector 395, the 360 cycle signal developed by the receiver 375 as a result of heterodyning the signal radiated by the stations 310 and 312 is passed through the filter 393 to operate the tone detector 396 and the 600 cycle signal developed by the receiver 375 as a result of heterodyning the signals radiated by the end stations 311 and 312 is passed through the filter 394 to operate a tone detector 397. Obviously, as long as all of the stations remain in operation, all three of the tone detector relays 395a, 396a and 397a remain open. If one of the stations 310, 311 or 312 goes off the air, however, two of the heterodyne signals developed disappear and two of the tone detector relays are closed. Specifically, if the end station 311 fails, the 240 and 600 cycle signals disappear from the output of the reference receiver 375 and only the 360 cycle signal is present. This condition will be referred to hereinafter as condition A. If, on the other hand, the end station 312 fails, the 360 and 600 cycle signals disappear from the output of the receiver 375 and only the 240 cycle heterodyne signal is present. This condition will be referred to as condition B. Finally, if the center station 310 fails, the 240 and 360 cycle signals disappear from the output of the receiver 375 and only the 600 cycle heterodyne signal is present. This will be referred to as condition C.

The presence or absence of the heterodyne signals at the output of the receiver, of course, operates the tone detectors 395, 396 and 397 and produces the described operation of the tone detector relays. These relays are employed to control a relay matrix circuit 398 which has the function of translating the relay operations into signal indications. Power for operating the relay matrix is, of course, derived from a suitable A.C. source through line conductors 403 and 404. Presence of the A.C. power is indicated by a power-on light 405 connected directly across the line conductors. Line conductor 404 passes through a manually operated reset switch 406 to one side of a plurality of signal lights 407, 408, 409 and 410. The other side of the light 410 is connected through the normally closed contacts of time delay relay 411 to the line conductor 403. Thus, as long as the contacts of the relay 411 remain closed, the system on light 410 is illuminated to indicate that the relay matrix has power and is conditioned for operation. Line conductor 404 is also connected to the movable arms of each of the tone detector relays 395a, 396a and 397a. The normally open contact of each of the tone detector relays is connected to one side of the operating coil of a relay in the matrix. Specifically, the normally open contact of relay 395a is connected to one side of the operating coil of relay 400, the normally open contact of tone detector relays 396a is connected to one side of the operating coil of relay 401 and the normally open contact of tone detector 397a is connected to one side of the operating coil of relay 402. The other sides of the operating coils of the relays 400, 401 and 402 are connected together and through the normally closed contacts of the time delay relay 411 to the line conductor 403. As long as the system is functioning properly the line conductor 403 is also connected through contact 415b of relay 415, through contact 416b of relay 416 and through contact 417b of relay 417 to the operating coil of an alarm relay 418. Thus, the latter relay is energized to maintain its contacts open.

If a failure occurs as, for example, if condition A described above should exist, the relays 395a and 397a are closed to energize the operating coils of relays 400 and 402. Energization of the latter two relays completes a circuit from line conductor 403 through the now closed contact 402a, through the now closed contact 400b and through a signal connector 419 to the signal light 408, which is thus illuminated to indicate that the end station 311 has failed. Signal light 407 does not come on, in view of the fact that its energizing circuit is open at contact 401b and signal light 409 is not energized, since its energizing circuit is open at contact 401a. Energization of signal connector 419 also applies operating potential across the coil of relay 416 and induces this relay to close contact 416a in order to lock the coil of the relay 416 directly across the line conductors 403 and 404 and to open contact 416b in order to break the energizing circuit for the alarm relay 418. The latter relay thus causes its movable arms to move to the position illustrated in FIG. 8 so that contact 418a closes to operate an alarm circuit and contact 418b closes to connect the operating element 420 of the time delay relay 411 across the line conductors 403 and 404. If the failure is momentary or instantaneous, the system operation will be restored before the time delay relay 411 can operate. However, unless the failure corrects itself immediately, the time delay relay 411 is actuated to open its contact 411a in order to break the energizing circuit for the coils of the relays 400, 401 and 402 and to turn off the system-on light 410. As before, the time delay period of the relay 411 is less than the time required for the transfer to the standby equipment at the station which failed and, accordingly, the failure indication will be maintained even though the standby equipment is placed into operation. Thus, even after the contact 411a is opened, the alarm circuit remains energized and the light 408 remains illuminated despite the fact that system operation has, in the interim, been restored. The illumination of light 408, of course, informs the operator at the reference station 313 that the inoperative transmitter at the end station 11 is defective and must be repaired. If the standby transmitter at the end station 311 has been turned on, its operation will, of course, be indicated by the signal monitor circuit 381 and the standby transmitter can be left on to maintain continuous operation of the system while the defective transmitter is repaired.

As soon as the necessary repairs have been made, the operator may restore the failure indicator 380 by manually opening the reset switch 406, which immediately turn off the signal light 408 and also removes energizing potential for the operating element 420 of the time delay relay 411. In addition, the reset switch also opens the energizing circuit to the relay 416 and allows this relay to return to its normal position. Thus, when the reset switch is again closed, the energizing circuit to the alarm relay 418 is complete, providing, of course, that no operational failure exists to operate the tone detector relays. Operation of the alarm relay 418, of course, opens contact 418a to turn off the alarm and opens contact 418b to remove the operating element 420 of the time delay relay 411 from the line.

Under condition B described above, the end station 312 is rendered inoperative, the tone detector relays 396a and 397a are both closed and the relays 401 and 402 are energized to close their contacts. An energizing circuit is thus completed from line conductor 403 through the now closed contact 402b, through the closed contact 401b and through signal connector 421 to signal light 407 which becomes illuminated to indicate that the end station 312 has failed. Light 408 is not illuminated, in view of the fact that its energizing circuit is open at contact 400b, while light 409 is not illuminated because its energizing circuit is open at contact 400a. Connector 421 also supplies potential for operating relay 417, which opens contact 417b in order to break the energizing circuit to the alarm relay 418 and, at the same time, closes contact 417a to lock operating coil of relay 417 across the line conductors 403 and 404. Deenergization of the alarm relay 418 has the results described above and the lock-on feature maintains the indication until the failure indicator circuit is manually reset by opening the reset switch 406.

Under condition C described above, the end station 310 fails and the tone detector relays 395a and 396a are both closed in order to energize relays 400 and 401. A circuit is then completed from line conductor 403 through the now closed contact 401a, through the closed contact 400a and through signal connector 422 to the signal light 409 which becomes illuminated to indicate a failure at the center station 310. Signal light 408 is not turned on, since its energizing circuit is open at contact 402a and light 407 is not turned on because its energizing circuit is open at contact 402b. Application of potential to connector 422 operates relay 415 which, in turn, breaks contact 415b in order to interrupt the energizing circuit for the alarm relay 418 and closes contact 415a in order to lock the operating coil of the relay 415 across the line conductors 403 and 404. Interruption of the energizing circuit for the alarm relay 418 has the results previously described, in that an alarm circuit is completed and the operation of the time delay relay 411 is initiated. At the end of the delay period provided by the relay 411, the light 409 is maintained illuminated and the relay 415 is locked across the line in the manner previously described. The circuit remains in this condition until the reset switch 406 is manually opened. In view of the foregoing description, it will be recognized that the failure indicator 380 provides an immediate indication to the reference station operator that one of the continuous wave transmitters 310, 311 or 312 has failed and, in addition, identifies the location of the failure so that immediate steps can be taken to correct it. Moreover, the system illustrated in FIGS. 7 and 8, like that shown in FIGS. 1 to 6, inclusive, permits all of the transmitting facilities to be turned on or off from a single station and, in addition provides standby transmitting equipment at each station which is rendered automatically effective in the event of operational failure.

While particular embodiments of the invention have been described, it will be understood that many modifications will become apparent to those skilled in this art and it is, therefore, contemplated by the appended claims to cover any such modifications that fall within the spirit and scope of the appended claims.

What is claimed as new and desired to be secured by Letters Patent of the United States is:

1. In a transmitting system of the hyperbolic type employing radiation of waves from a plurality of spaced apart points, a transmitting station at one of said points comprising a first transmitter and a second transmitter, a circuit for rendering said transmitters effective one at a time so that the ineffective transmitter serves as a standby transmitter, a wave signal receiver responsive to a wave radiated from a point remote from said station, and means responsive to signals from said receiver for controlling said circuit to transfer the operation from one of said transmitters to the other in response to the initial application of signals from said receiver.

2. In a transmitting system of the hyperbolic type employing radiation of waves from a plurality of spaced apart points, a transmitting station at one of said points comprising a first transmitter and a second transmitter, a circuit for rendering said transmitters effective one at a time so that the ineffective transmitter serves as a standby transmitter, a wave signal receiver responsive to a wave radiated from a point remote from said station, means responsive to signals from said receiver for controlling said circuit to transfer the operation from one of said transmitters to the other in response to the initial application of signals from said receiver, and said circuit including time delay means for preventing the transfer from said one transmitter to the other until signals have been continuously supplied from said receiver throughout a predetermined interval.

3. In a transmitting system of the hyperbolic type employing radiation of waves from a plurality of spaced apart points, a transmitting station at one of said points comprising a first transmitter and a second transmitter, a circuit for rendering said transmitters effective one at a time so that the ineffective transmitter serves as a standby transmitter, means for turning on said station, and means in said circuit for transferring operation from one of the transmitters to the other each time said station is turned on.

4. In a transmitting system of the hyperbolic type employing radiation of waves from a plurality of spaced apart points, a transmitting station at one of said points comprising a first transmitter and a second transmitter, a circuit for rendering said transmitters effective one at a time so that the ineffective transmitter serves as a standby transmitter, means including a wave signal receiver for turning said station on or off in response to a wave radiated from a point remote from said station, and means for controlling said circuit to transfer the operation from one of said transmitters to the other in response to the wave.

5. In a transmitting system of the hyperbolic type employing radiation of waves from a plurality of spaced apart points, a transmitting station at one of said points comprising a first transmitter and a second transmitter, a control circuit for rendering said transmitters effective one at a time so that the ineffective transmitter serves as a standby transmitter, a wave signal receiver responsive to a wave radiated from a point remote from said station, means responsive to signals from said receiver for controlling said control circuit to transfer the operation from one of said transmitters to the other in response to initial application of signals from said receiver, an antenna circuit, means including a relay in said control circuit for automatically connecting said other transmitter to said antenna circuit and for disconnecting said one transmitter from said antenna circuit, said control circuit also including means for rendering said other transmitter operative after the transfer has occurred, means for sampling the signal supplied to said antenna circuit by said other transmitter, said control circuit including means responsive to an absence of signals from the sampling means incident to failure of said other transmitter for automatically rendering said one transmitter operative and for causing said relay to connect said one transmitter to the antenna circuit, said circuit also including means for rendering both of the transmitters inoperative in response to absence of signals from said receiver.

6. In a transmitting system of the hyperbolic type employing radiation of waves from a plurality of spaced apart points, a transmitting station at one of said points comprising a first transmitter and a second transmitter, a control circuit for rendering said transmitters effective one at a time so that the ineffective transmitter serves as a standby transmitter, a wave signal receiver responsive to a wave radiated from a point remote from said station, means responsive to signals from said receiver for controlling said control circuit to transfer the operation from one of said transmitters to the other in response to initial application of signals from said receiver, an antenna circuit, means including a relay in said control circuit for automatically connecting said other transmitter to said antenna circuit and for disconnecting said one transmitter from said antenna circuit, said control circuit also including means for rendering said other transmitter operative after the transfer has occurred, means for sampling the signal supplied to said antenna circuit by said other transmitter, said control circuit including means responsive to an absence of signals from the sampling means incident to failure of said other transmitter for automatically rendering said one transmitter operative and for causing said relay to connect said one transmitter to the antenna circuit, said circuit also including means for rendering both of the transmitters inoperative in response to absence of signals from said receiver, the last named means including a time delay device for preventing the transmitters from being rendered inoperative for a predetermined period following the initial loss of signals from said receiver.

7. In a transmitting system of the hyperbolic type employing radiation of waves from a plurality of spaced apart points, a transmitting station at one of said points comprising a first transmitter and a second transmitter, a control circuit for rendering said transmitters effective one at a time so that the ineffective transmitter serves as a standby transmitter, a wave signal receiver responsive to a wave radiated from a point remote from said station, means responsive to signals from said receiver for controlling said control circuit to transfer the operation from one of said transmitters to the other in response to initial application of signals from said receiver, said control circuit including time delay means for preventing the transfer from one transmitter to the other until signals have been continuously supplied from said receiver throughout a predetermined interval, an antenna circuit, means including a relay in said control circuit for automatically connecting said other transmitter to said antenna circuit and for disconnecting said one transmitter from said antenna circuit, said control circuit also including means for rendering said other transmitter operative after the transfer has occurred, the last named means including a time delay device for preventing said other transmitter from being rendered operative until the expiration of a predetermined interval following said transfer, means for sampling the signal supplied to said antenna circuit by said other transmitter, said control circuit including means responsive to an absence of signals from the sampling means incident to failure of said other transmitter for automatically rendering said one transmitter operative and for causing said relay to connect said one transmitter to the antenna circuit, said control circuit also including means for rendering both of the transmitters inoperative in response to absence of signals from said receiver, and the last named means including a time delay device for preventing the transmitters from being rendered inoperative for a predetermined period following the loss of signals from said receiver.

References Cited in the file of this patent

UNITED STATES PATENTS

| | | |
|---|---|---|
| 2,437,876 | Cohn | Mar. 16, 1948 |
| 2,601,472 | Van Weel | June 24, 1952 |
| 2,699,495 | Magnuski et al. | Jan. 11, 1955 |
| 2,806,944 | Sheffield et al. | Sept. 17, 1957 |
| 2,864,943 | Schultz | Dec. 16, 1958 |